US012551303B2

(12) United States Patent
Seo et al.

(10) Patent No.: US 12,551,303 B2
(45) Date of Patent: Feb. 17, 2026

(54) VASCULAR INTERVENTIONAL SURGERY ROBOT HAVING MULTI-CONTACT PLATE, AND VASCULAR INTERVENTIONAL SURGERY SYSTEM

(71) Applicant: PERAZAH INC., Ansan-si (KR)

(72) Inventors: Jong Tae Seo, Gwangju-si (KR); Hwan Taek Ryu, Ansan-si (KR)

(73) Assignee: PERAZAH INC., Ansan-si (KR)

( * ) Notice: Subject to any disclaimer, the term of this patent is extended or adjusted under 35 U.S.C. 154(b) by 406 days.

(21) Appl. No.: 18/272,798

(22) PCT Filed: Jan. 19, 2022

(86) PCT No.: PCT/KR2022/000961
§ 371 (c)(1),
(2) Date: Jul. 18, 2023

(87) PCT Pub. No.: WO2022/158839
PCT Pub. Date: Jul. 28, 2022

(65) Prior Publication Data
US 2024/0299107 A1    Sep. 12, 2024

(30) Foreign Application Priority Data

Jan. 19, 2021  (KR) ........................ 10-2021-0007613

(51) Int. Cl.
*A61B 34/30* (2016.01)
*A61M 25/00* (2006.01)
(Continued)

(52) U.S. Cl.
CPC ......... *A61B 34/30* (2016.02); *A61M 25/0113* (2013.01); *A61M 25/09041* (2013.01);
(Continued)

(58) Field of Classification Search
CPC ........ A61B 2034/301; A61B 2034/303; A61B 34/30; A61M 2025/0042; A61M 25/0113; A61M 25/0904
See application file for complete search history.

(56) References Cited

U.S. PATENT DOCUMENTS 8,187,229 B2    5/2012  Weitzner et al.
2007/0239106 A1  10/2007  Weitzner et al.

FOREIGN PATENT DOCUMENTS

JP    2019040734 A    3/2019
KR    20100069838 A    6/2010
(Continued)

OTHER PUBLICATIONS

International search report of PCT/KR2022/000961, May 2, 2022, English translation.

*Primary Examiner* — Scott Luan
(74) *Attorney, Agent, or Firm* — STIP Law Group, LLC

(57) ABSTRACT

A vascular interventional surgery robot having a multi-contact plate is provided. The vascular interventional surgery robot having a multi-contact plate comprises: a translational module for allowing a surgical wire to undergo translational motion; a translational motor which provides translational driving force for allowing the surgical wire to undergo translational motion, and which is disposed at one side of the translational module; a rotational module which axially rotates the surgical wire, and which rotates the translational module and the translational motor together during the axial rotation of the surgical wire; a translational motor driver for providing the translational driving force to the translational motor; and a rotary connection module for providing a path for an electrical line electrically connecting the translational motor driver and the translational motor, wherein the rotary connection module includes connection plates which are aligned in the longitudinal direction of the surgical wire and of which the number corresponds to that of one or more electrical lines, each of one or more connection plates has a slit which is open toward the center thereof so that the surgical wire is used in the direction of the rotational axis of the translational module by means of the rotational module, has the electrical line connected to one side thereof, and has an annular strip-shaped connection ring, of which one circumferential side is open through the slit, disposed therein, and the rotary connection module can (Continued)

include the multi-contact plate having at least two contact points at different positions in the circumferential direction on the surface of the connection ring to electrically connect the connection ring and the translational motor driver.

14 Claims, 21 Drawing Sheets

(51) Int. Cl.
*A61M 25/01* (2006.01)
*A61M 25/09* (2006.01)

(52) U.S. Cl.
CPC ... *A61B 2034/301* (2016.02); *A61B 2034/303* (2016.02); *A61M 2025/0042* (2013.01)

(56) References Cited

FOREIGN PATENT DOCUMENTS

| KR | 20150003292 A | 1/2015 |
| KR | 20160136904 A | 11/2016 |
| KR | 20170000178 A | 1/2017 |
| KR | 20180138202 A | 12/2018 |
| KR | 20200081224 A | 7/2020 |

[FIG. 1]
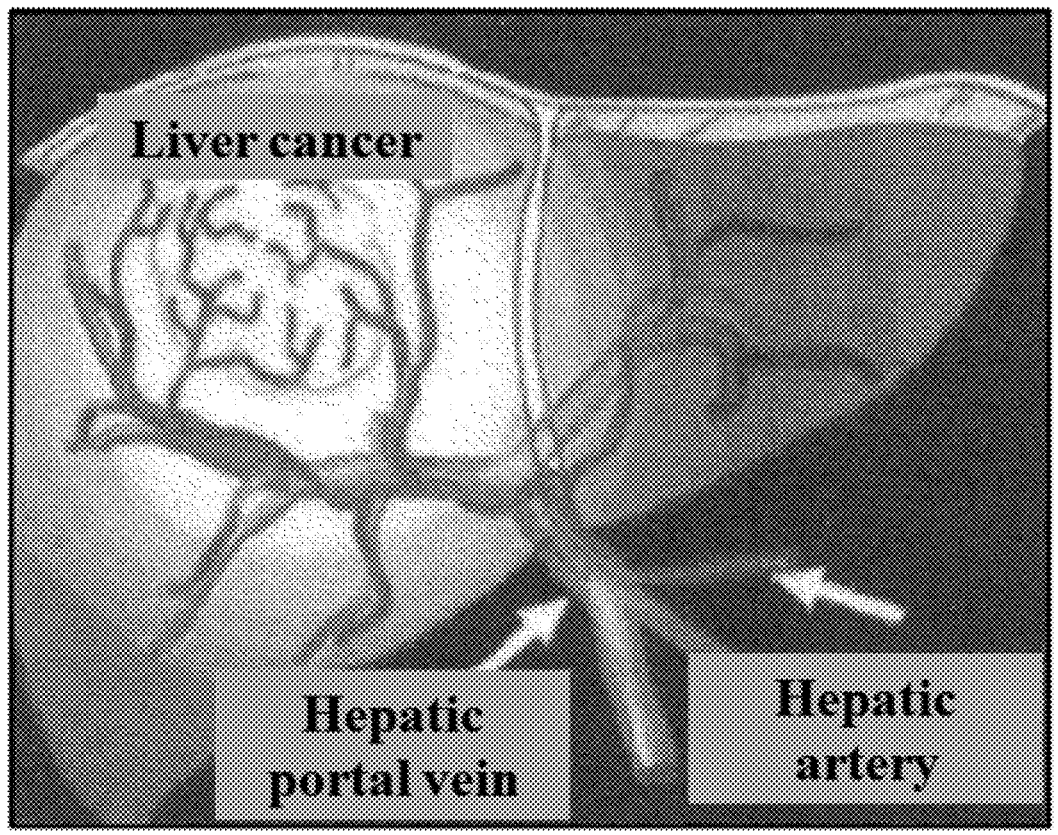

[FIG. 2]
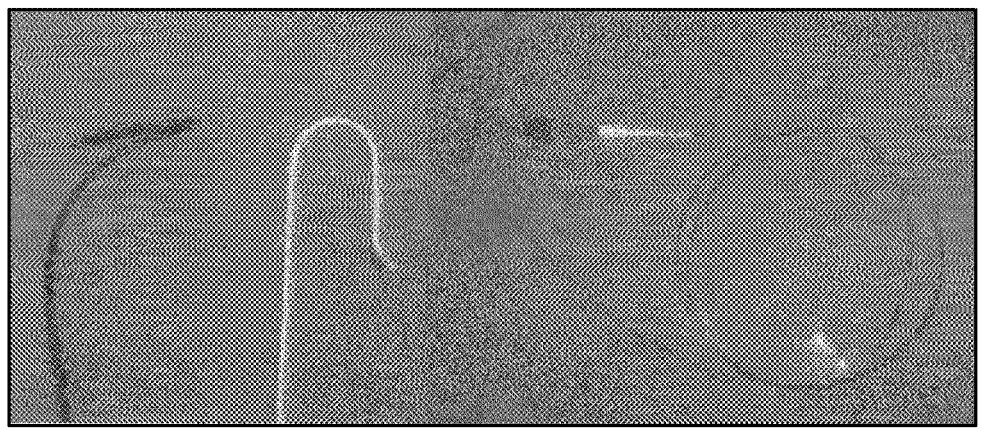

[FIG. 3]
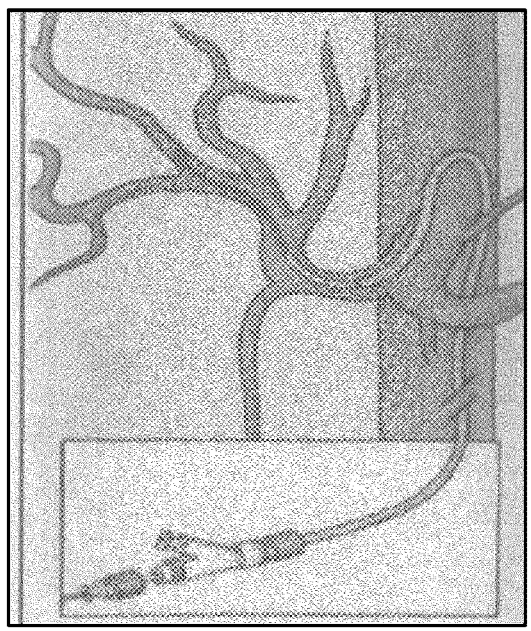

[FIG. 4]
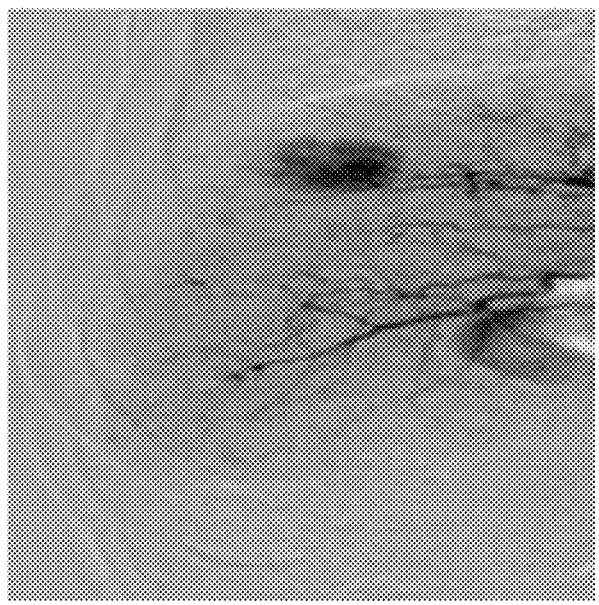

[FIG. 5]
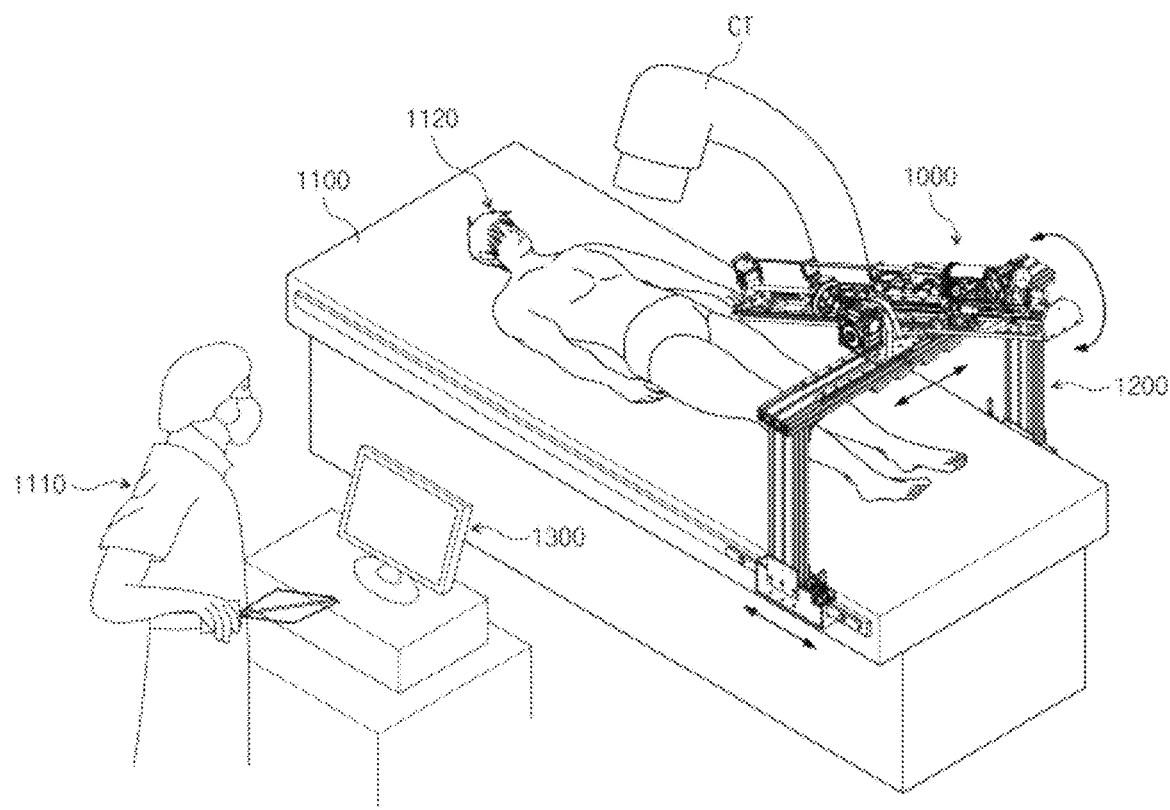

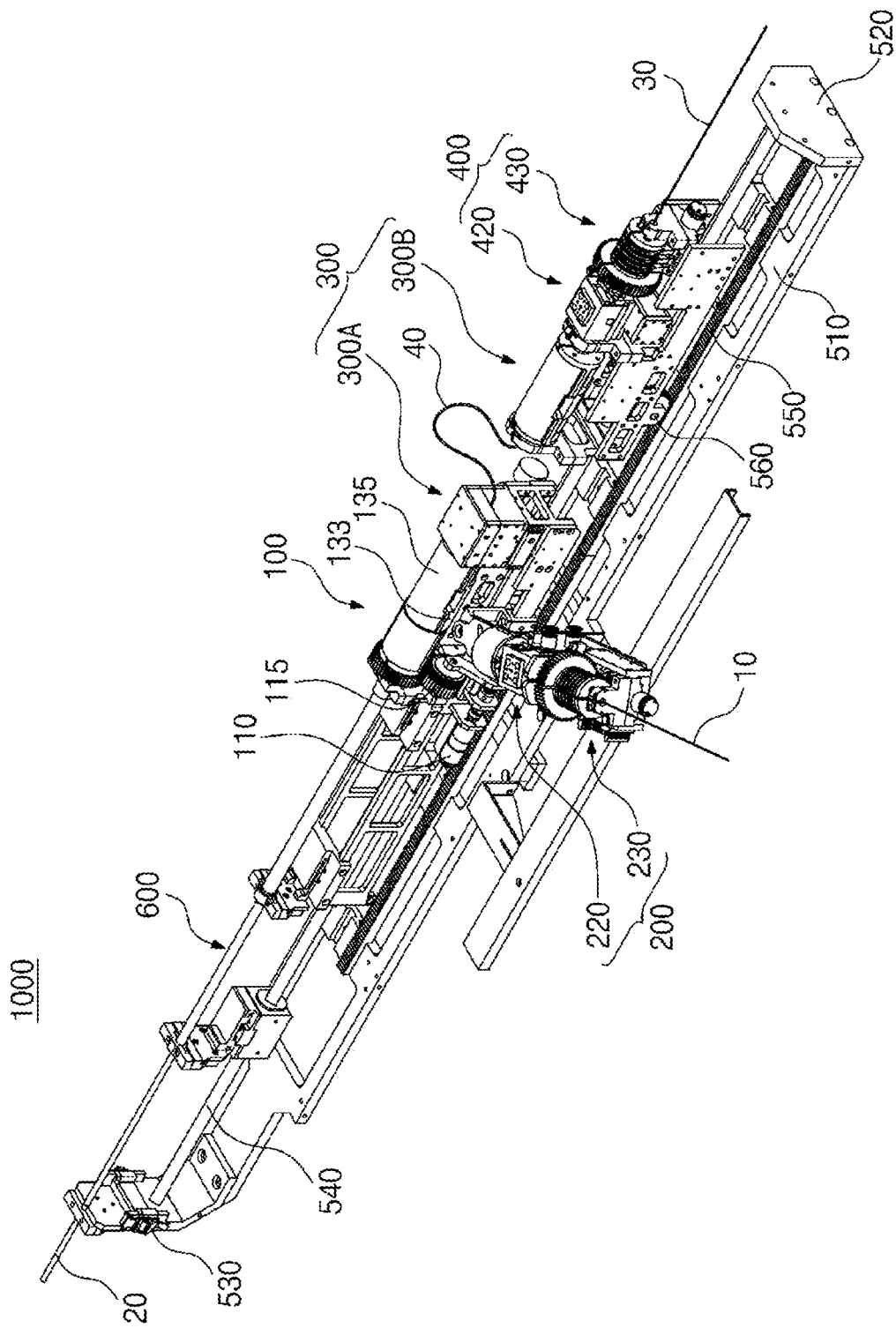
[FIG. 6]

[FIG. 7]
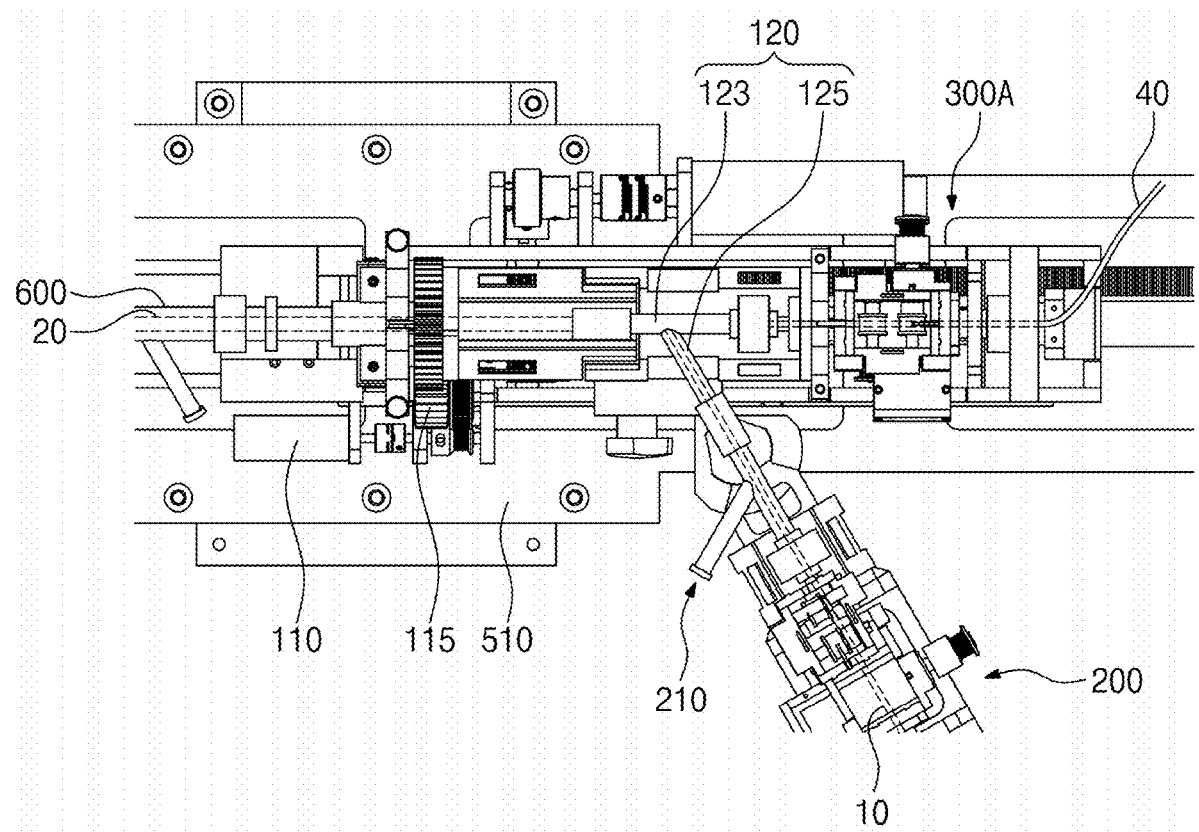

[FIG. 8]
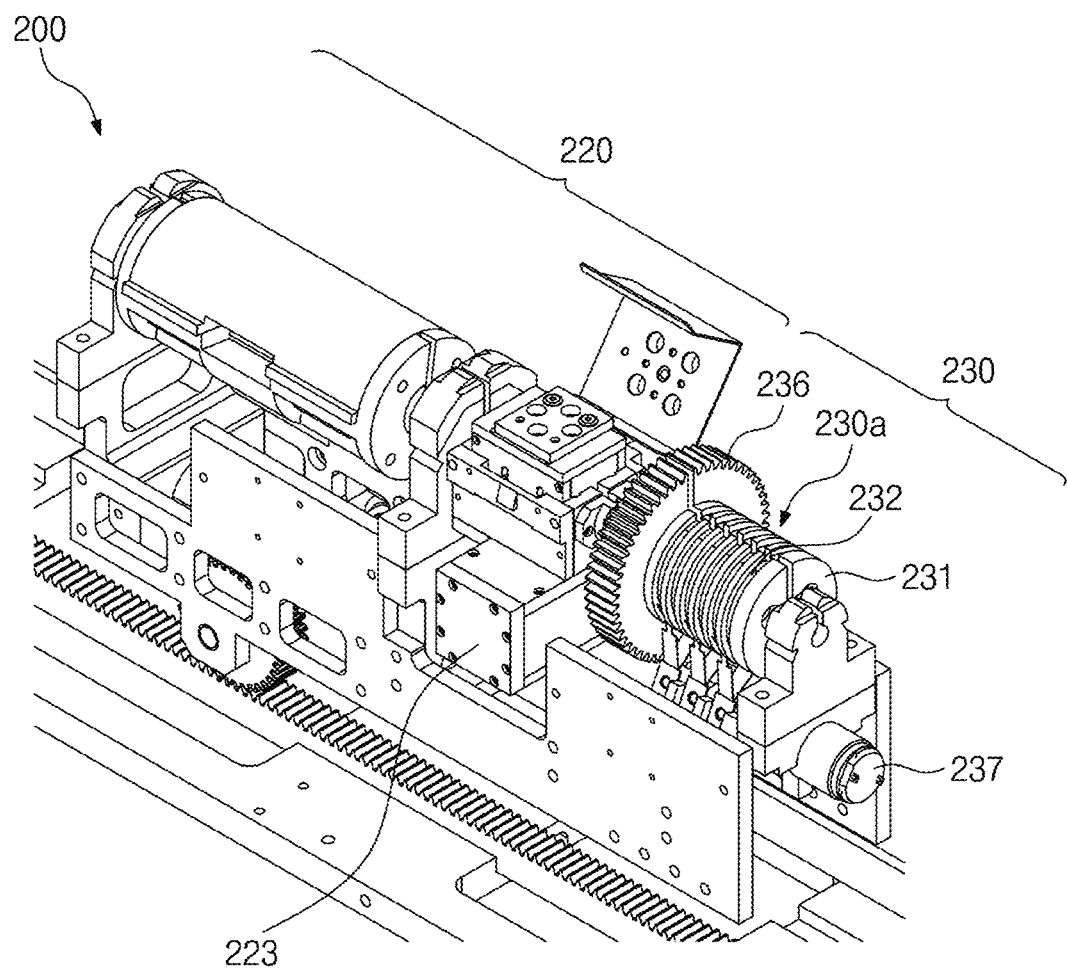

[FIG. 9]
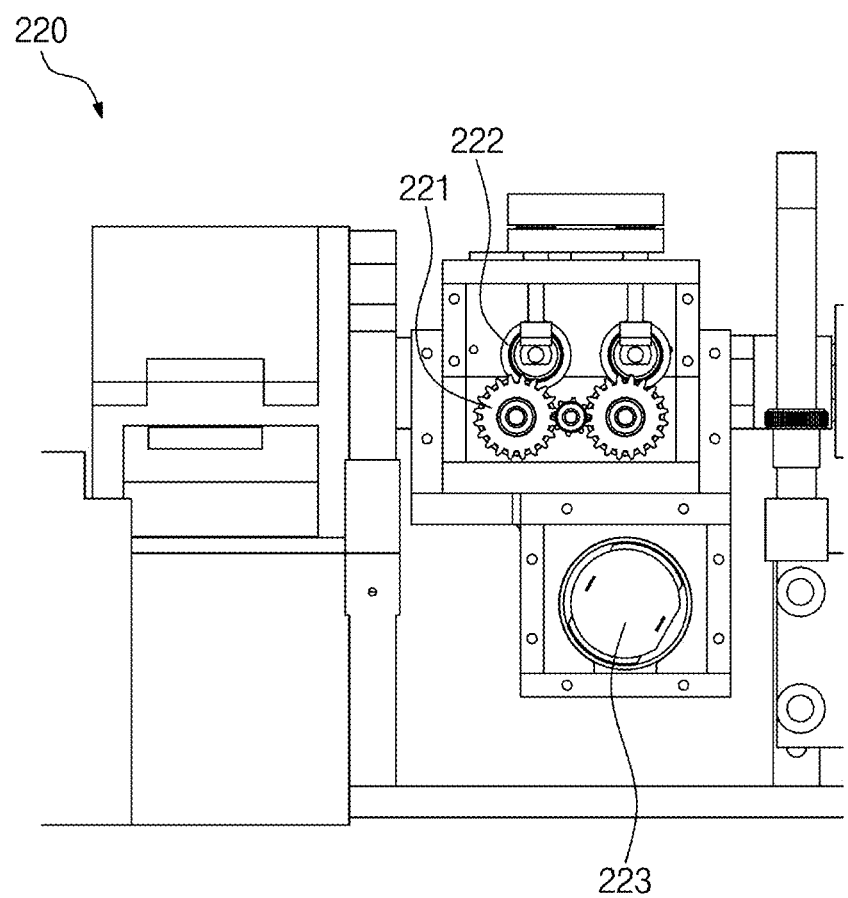

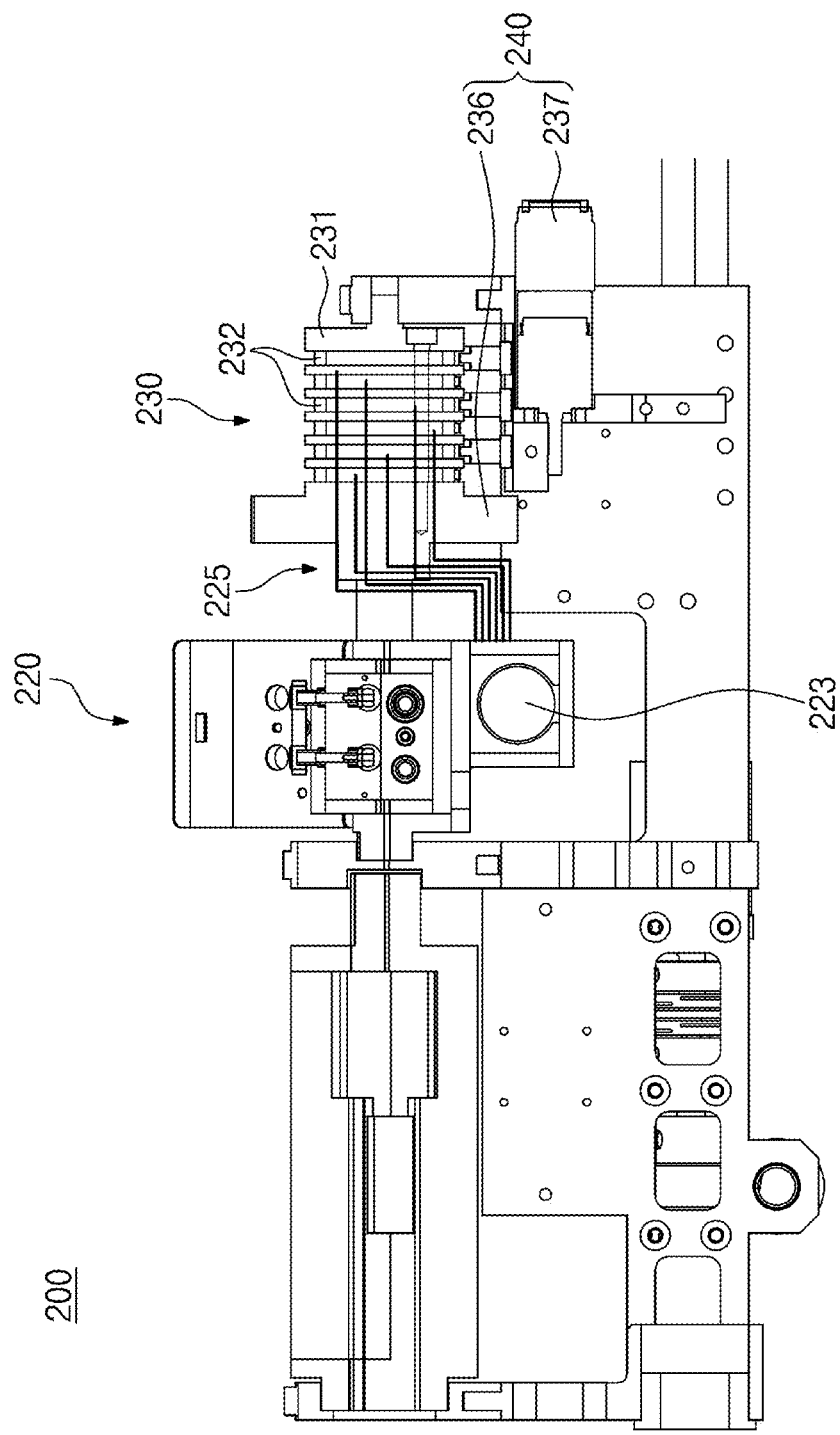

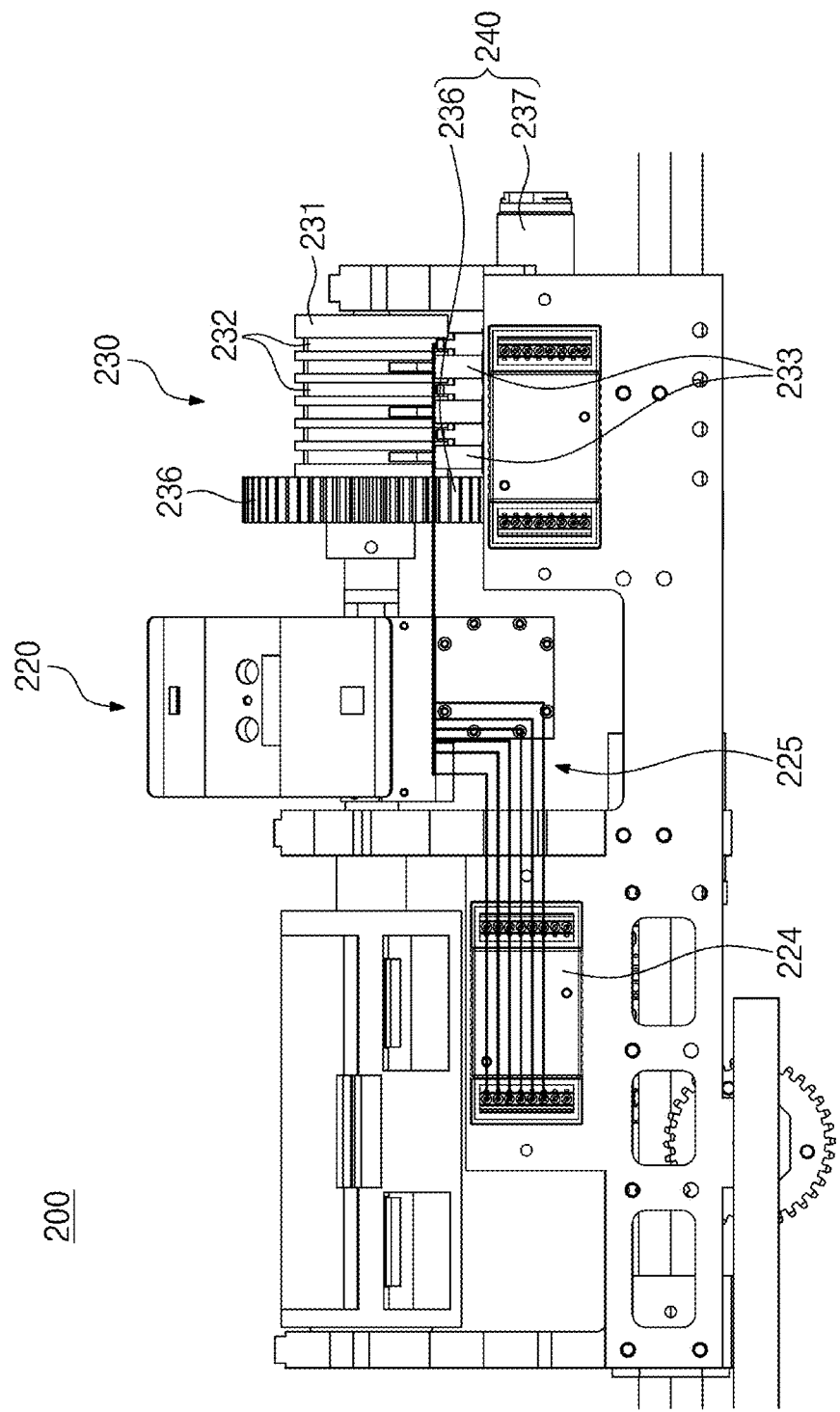

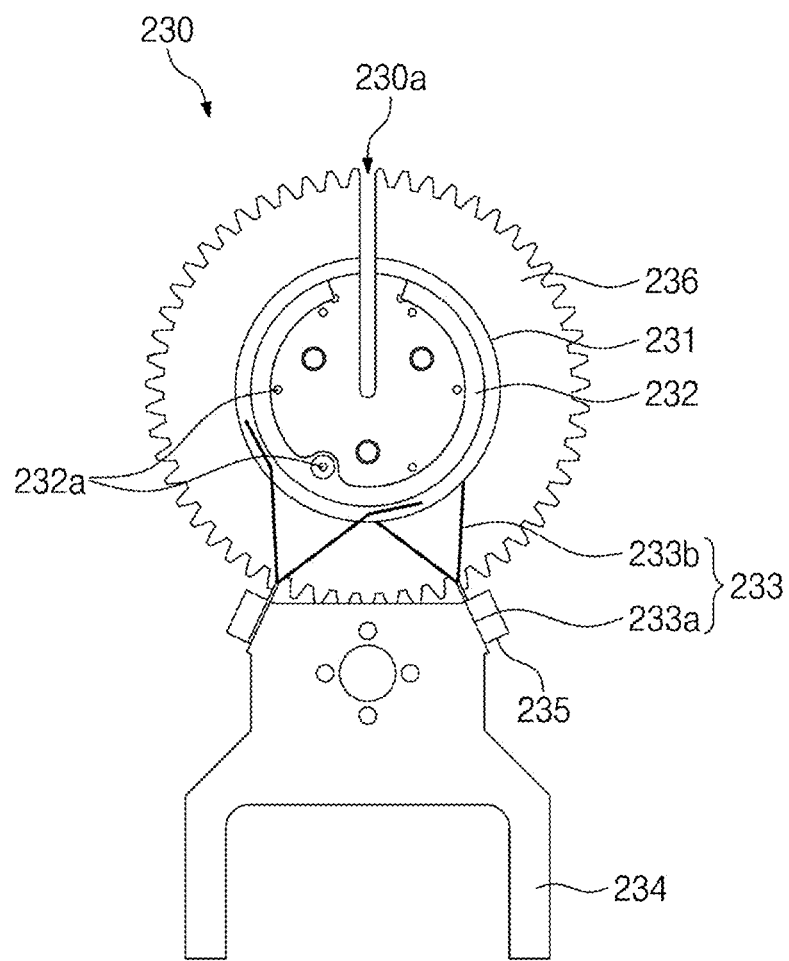
[FIG. 12]

[FIG. 13]
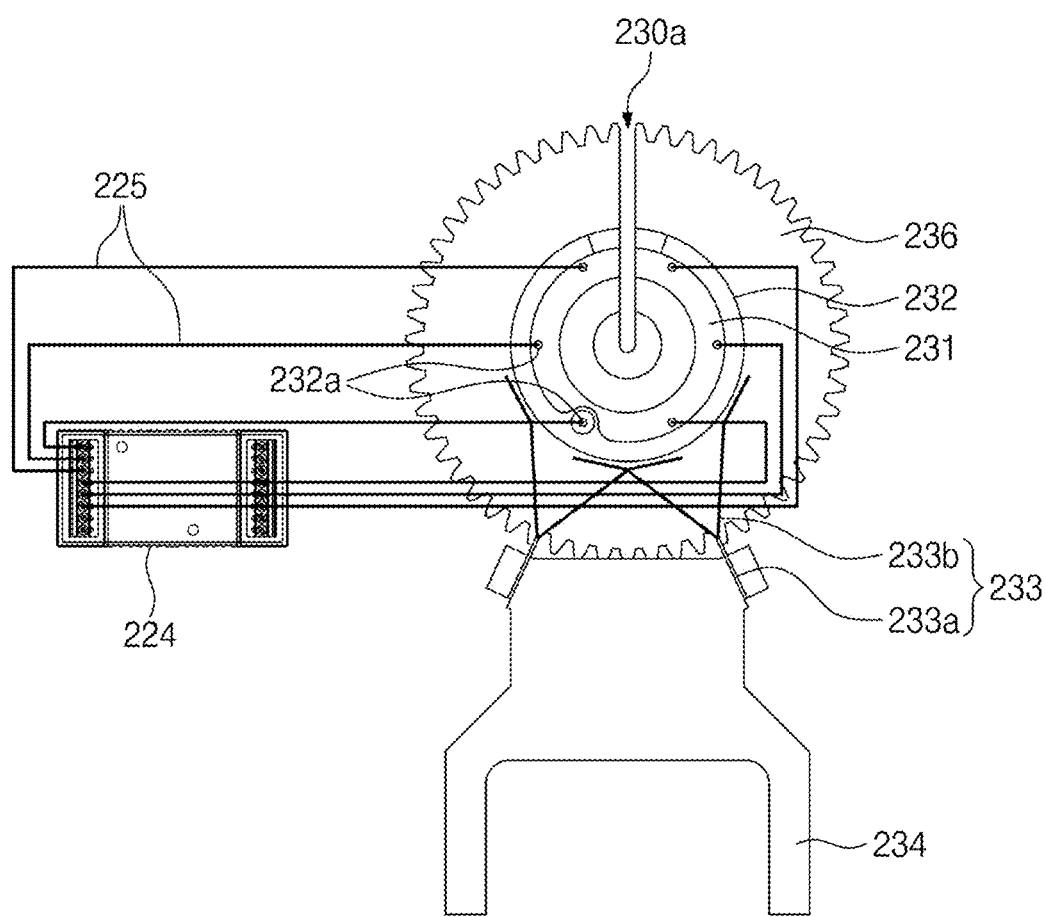

[FIG. 14]
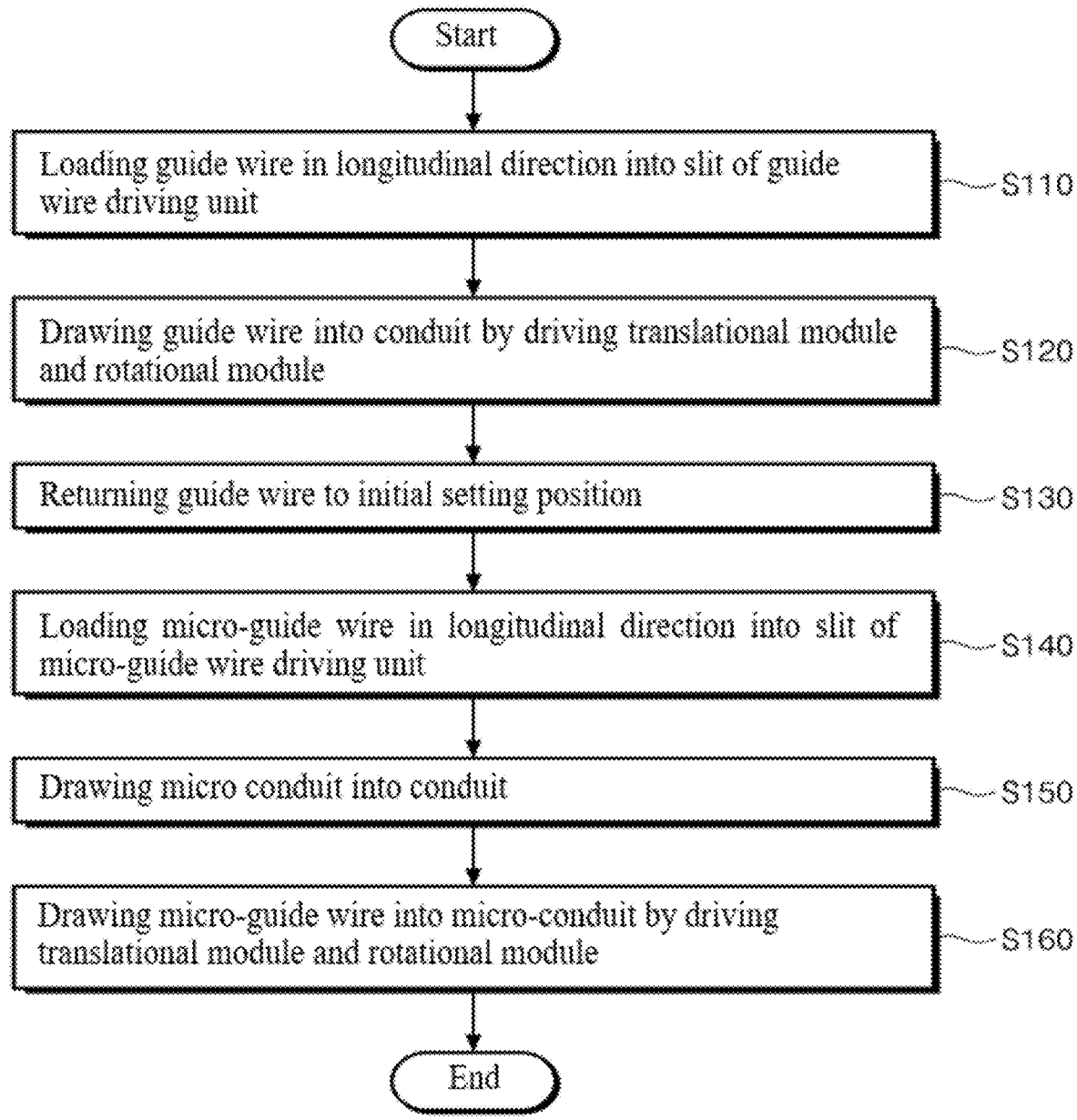

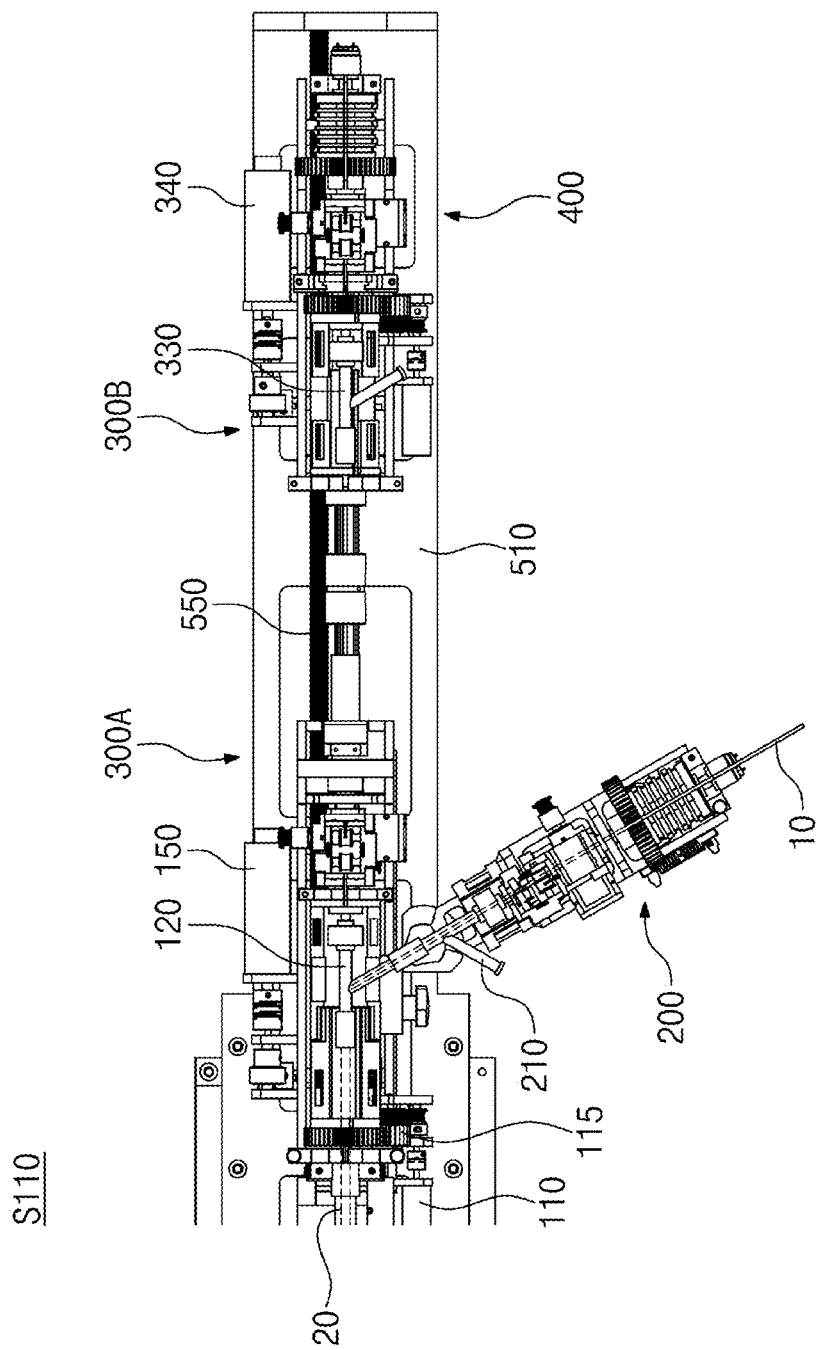
[FIG. 15]

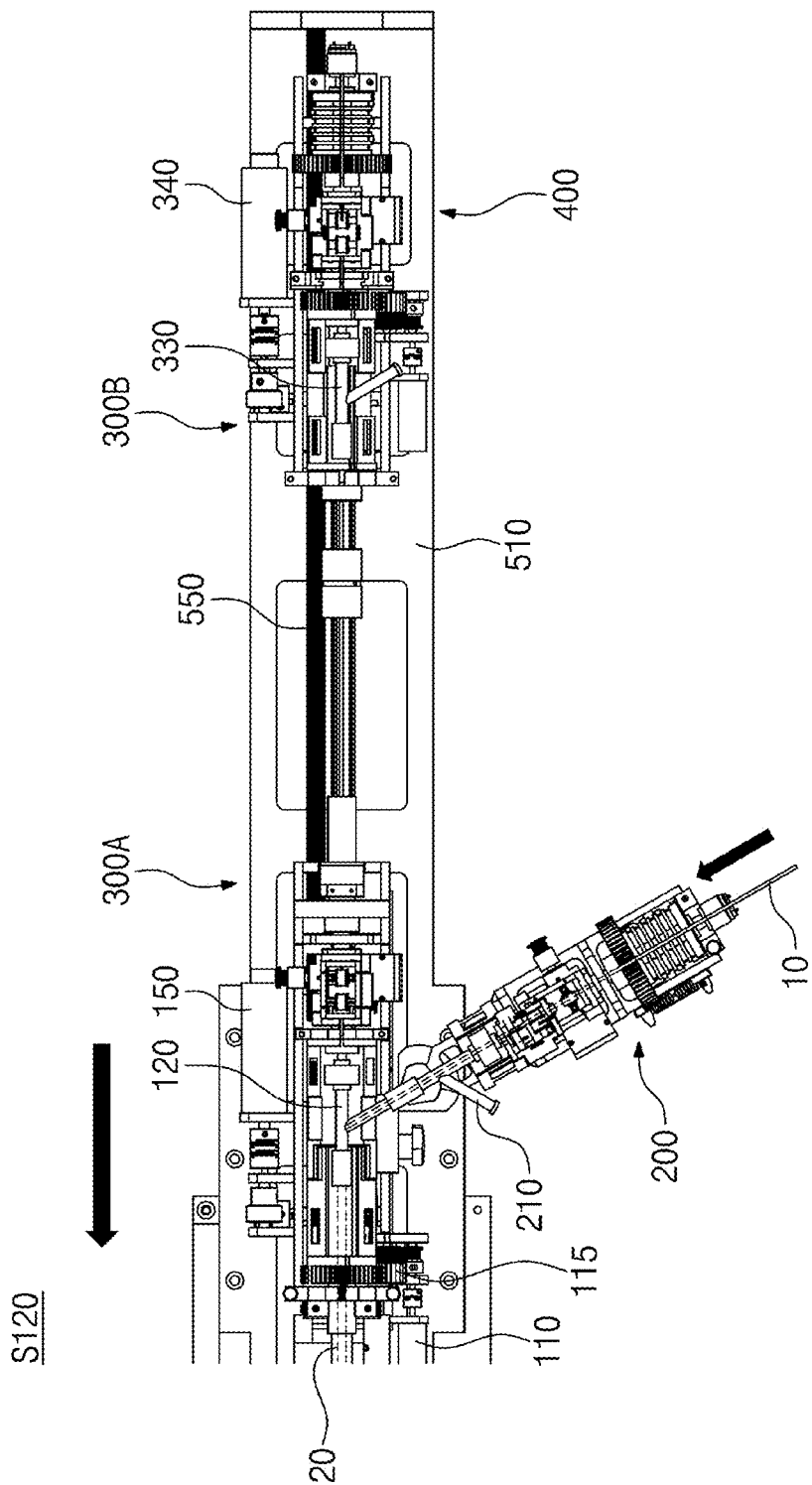
[FIG. 16]

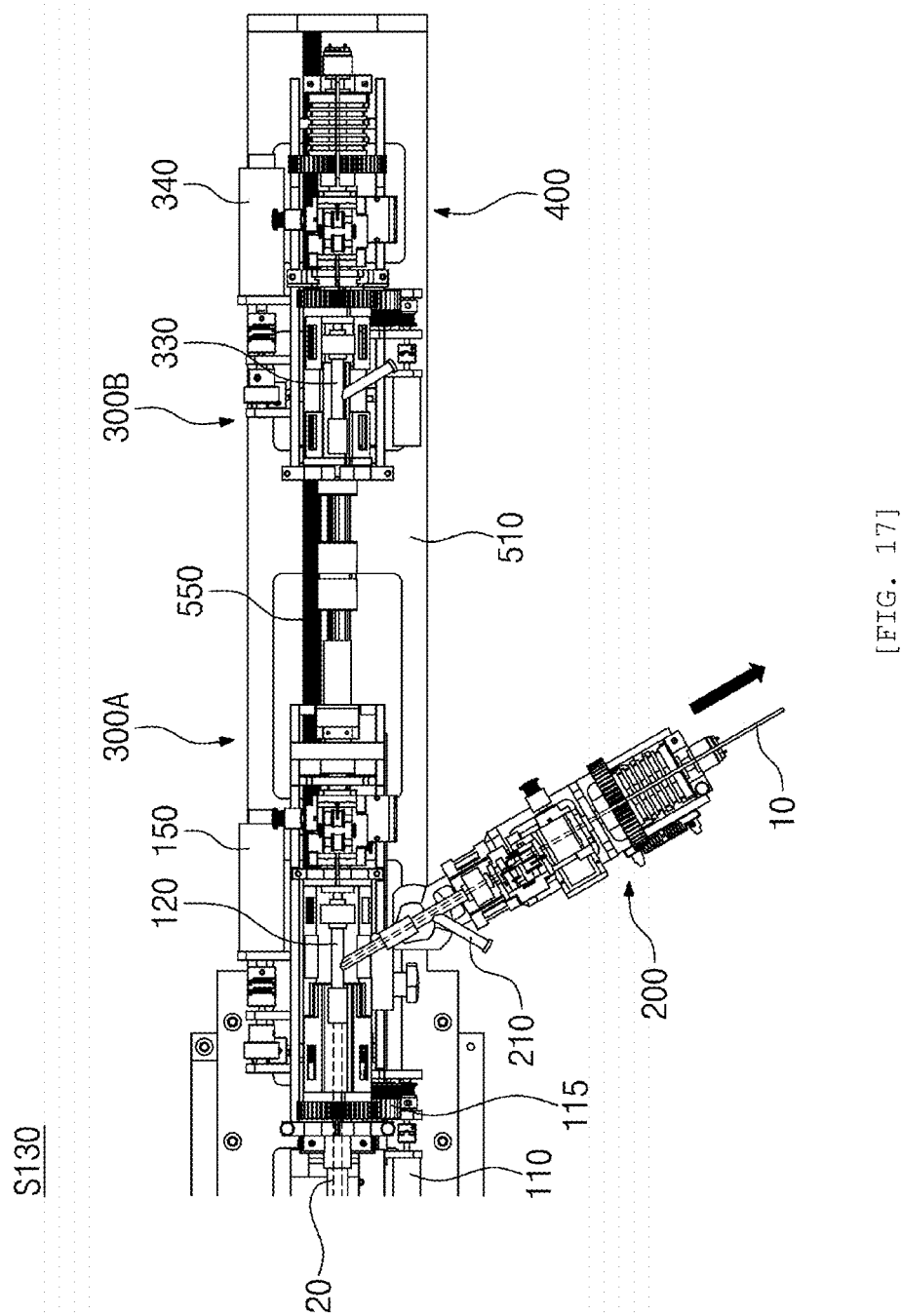
[FIG. 17]

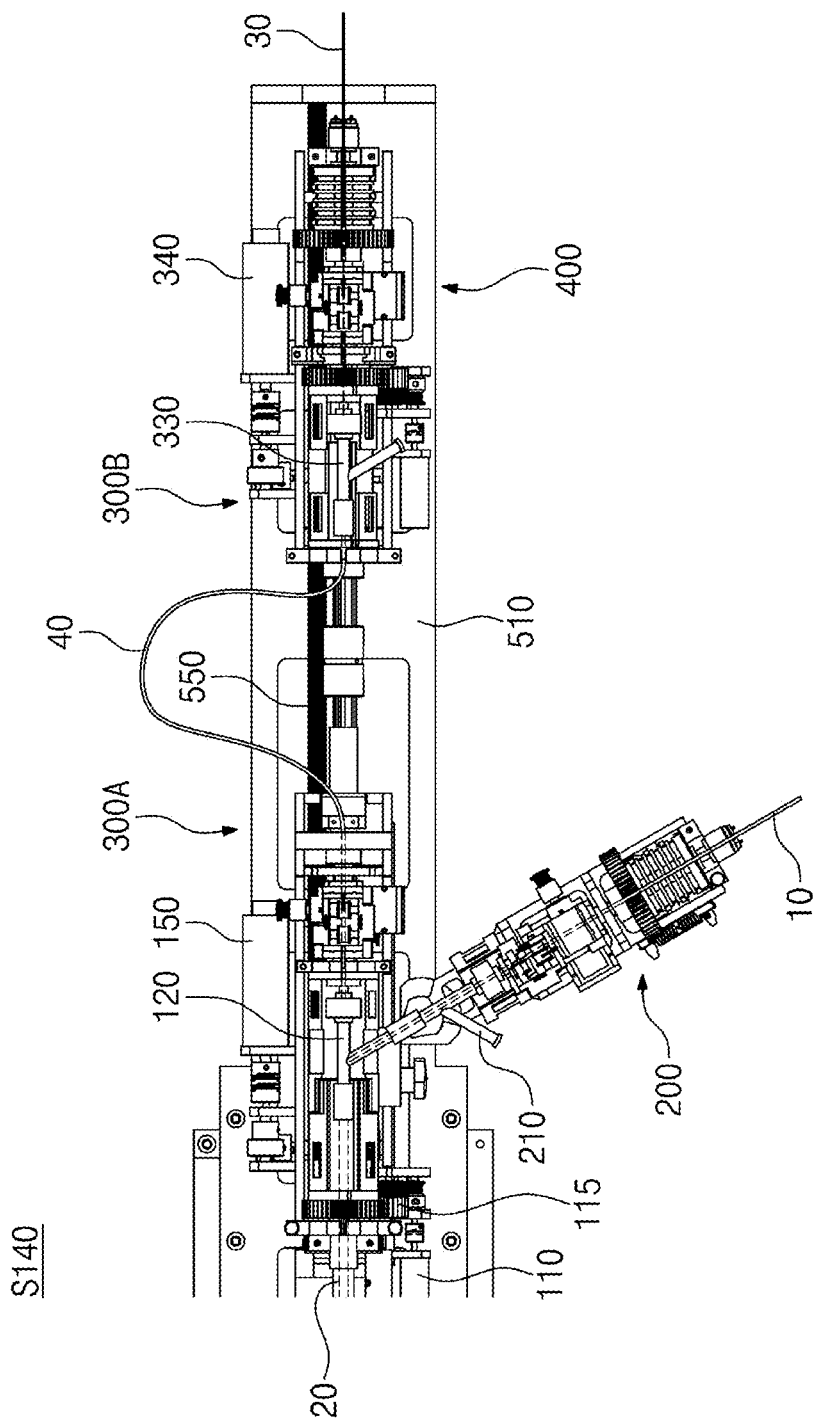
[FIG. 18]

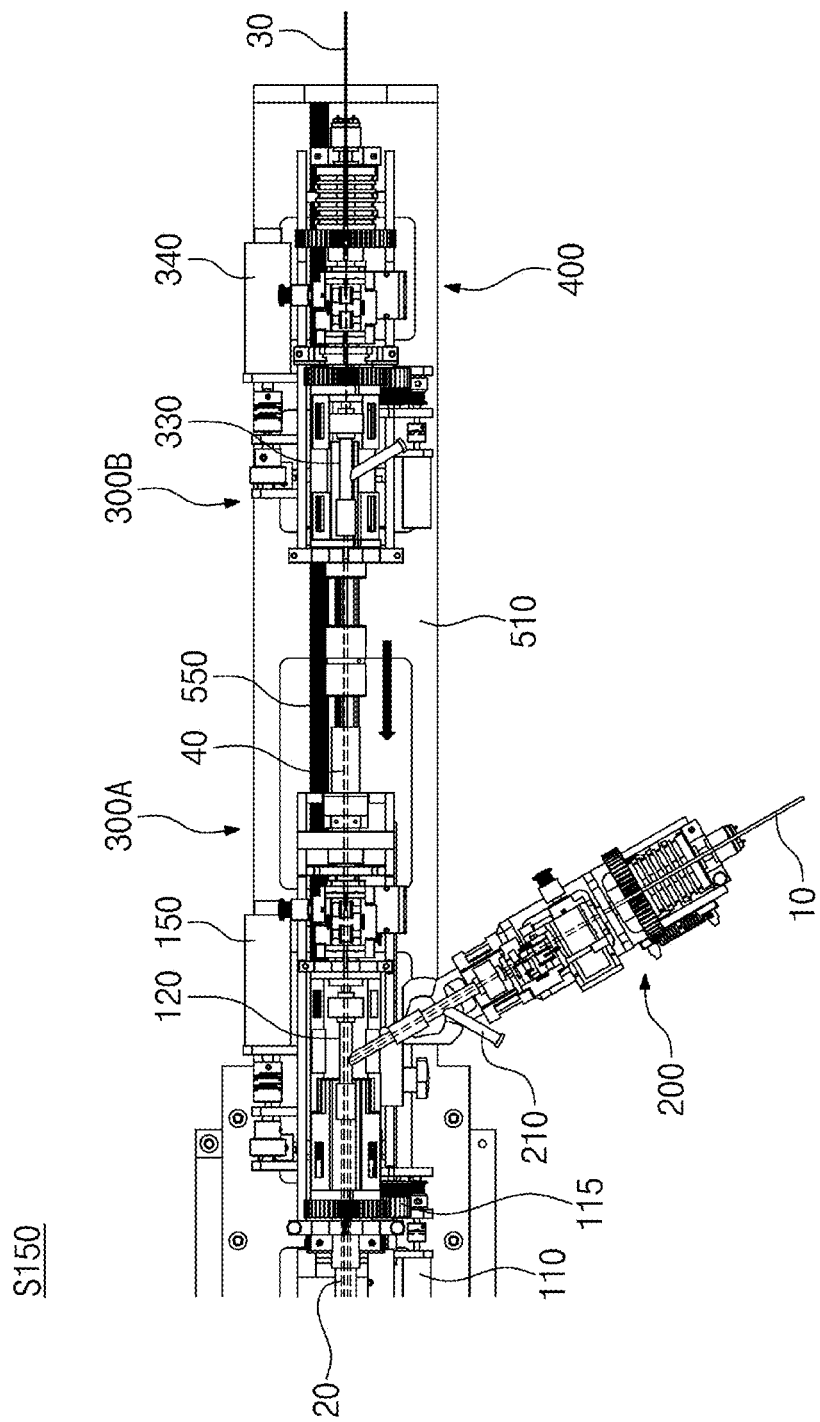
[FIG. 19]

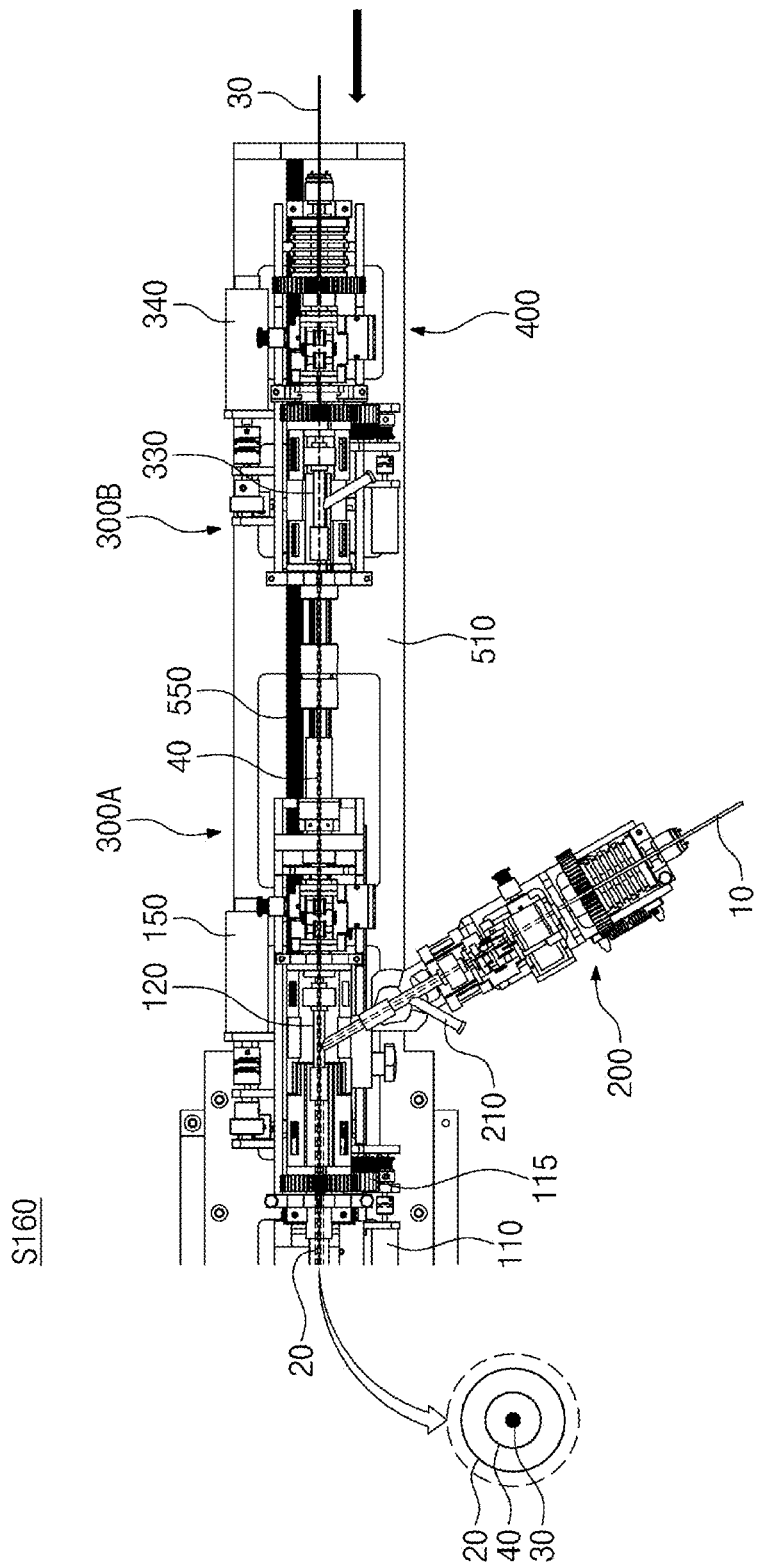
[FIG. 20]

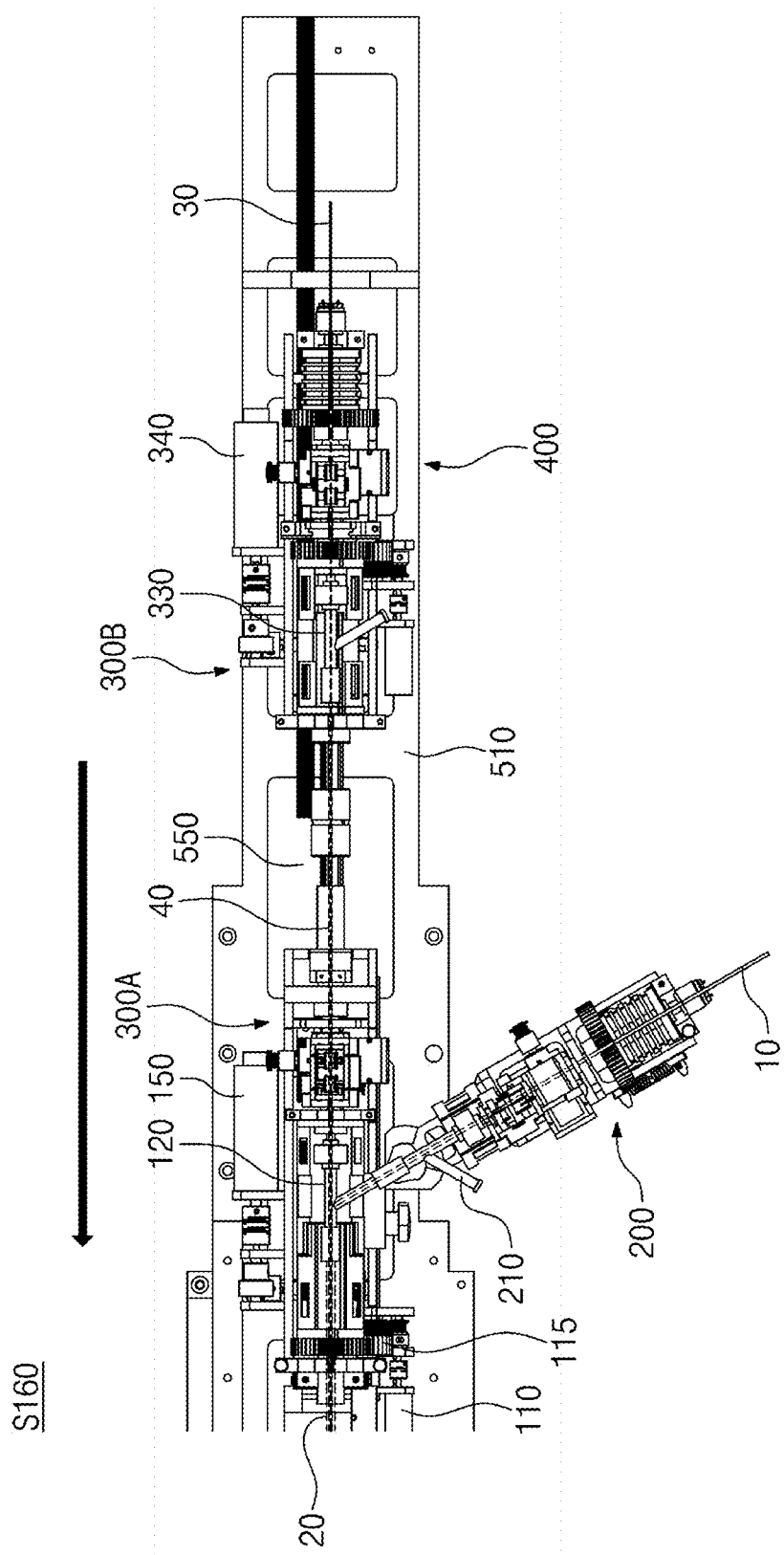
[FIG. 21]

VASCULAR INTERVENTIONAL SURGERY ROBOT HAVING MULTI-CONTACT PLATE, AND VASCULAR INTERVENTIONAL SURGERY SYSTEM

CROSS-REFERENCE TO RELATED APPLICATIONS

This application is the U.S. National Phase under 35 U.S.C. § 371 of International Application No. PCT/KR2022/000961, filed on Jan. 19, 2022, which in turn claims the benefit of Korean Application No. 10-2021-0007613, filed on Jan. 19, 2021, the entire disclosures of which are incorporated by reference into the present application.

TECHNICAL FIELD

The present invention relates to a vascular intervention robot having a multi-contact plate and a vascular intervention system, and more specifically, to a vascular intervention robot having a multi-contact plate and a vascular intervention system to improve convenience and stability of vascular intervention.

BACKGROUND ART

Vascular intervention refers to a minimally invasive procedure for the treatment of vascular diseases or cancer, in which a thin conduit (catheter) having a diameter of several mm or less is inserted percutaneously through a blood vessel to a lesion site mainly under X-ray fluoroscopy to reach a target organ and treat the lesion. Representative treatments for the vascular intervention in Korea and other countries include trans-arterial chemoembolization (TACE) for liver cancer, percutaneous angioplasty, and artificial vascular stent installation in aortic diseases.

In particular, liver cancer is the main cause of death according to data from the National Cancer Information Center published in 2011, it was found that the incidence of liver cancer is the fifth highest entirely in men and women after stomach, thyroid, colon and lung, but death from liver cancer is the second highest entirely in men and women after lung cancer. The radical treatment of liver cancer is surgical resection, but most advanced liver cancer, which cannot be treated radically at the time of diagnosis, is treated with TACE.

Specifically, TACE refers to a treatment for finding an artery that supplies nutrition to a liver tumor and administering an anticancer agent, thereby blocking blood vessels (see FIG. 1). According to the sequence of procedure, the femoral artery positioned in the inguinal region (groin) is pierced with a needle and then a guide wire, a conduit (see FIG. 2) or the like is inserted through the pierced femoral artery so as to be approached to an upper part of the origin of the hepatic artery (see FIG. 3). Thereafter, a hepatic arteriogram is obtained while injecting an angioplasty agent to obtain information necessary for treatment, such as the location, size, and blood supply pattern of the tumor, thereby determining treatment schemes such as types, doses and the like of appropriate anticancer agents or embolic materials. When the treatment scheme is determined, a micro-catheter having a diameter of about 3 F (1 F=0.33 mm) is inserted into the origin to treat the tumor. The procedure time is generally about 1 to 2 hours, and the patient's hepatic artery branch pattern and the artery branch distribution of the tumor may vary depending on the complexity.

As shown in FIG. 4, most of the blood vessels are divided into several branches or formed in a curved shape. Thus, in the vascular intervention procedure, inserts having various stages in diameter, which are called co-axial systems of conduits and guide wires, are used in combination to prevent damages to the blood vessels. In addition, in the conventional vascular intervention procedure, a master-slave type system capable of remotely controlling surgical tools is used to reduce radiation exposure of an operator.

In regard to a conventional vascular intervention robot applied to the vascular intervention procedure, a guide wire is translated by a roller mechanism and rotated by rotation of the roller mechanism due to a rotation mechanism connected to the roller mechanism. In this case, a motor and a motor drive for driving the roller mechanism may be connected to a power source through a plurality of cables.

In addition, the rotating mechanism includes a copper ring of a gear axially coupled thereto to rotate the roller mechanism, and a signal line may electrically come into contact with the copper ring through a pogo pin.

However, when the pogo pin comes into contact with the copper ring which rotates for the rotation of the roller mechanism, the signal applied to the motor for driving the roller mechanism is cut due to the twisting of the signal line, and damages frequently occur due to the pogo pin coming into contact with the rotating copper ring.

In addition, in the conventional art, the guide wire is allowed to be inserted only into the center of a gear disc having a copper ring, thereby causing inconvenience upon inserting and taking out the guide wire.

DISCLOSURE

Technical Problem

A technical problem to be solved by the present invention is to provide a vascular intervention robot having a multi-contact plate and a vascular intervention system so as to improve convenience and stability of vascular intervention.

Technical problems to be solved by the present invention are not limited to the above-described technical problem.

Technical Solution

In order to solve the above technical problem, the present invention provides a vascular intervention robot having a multi-contact plate.

According to one embodiment of the present invention, the vascular intervention robot having a multi-contact plate includes: a translational module for translating a surgical wire; a translational motor disposed on one side of the translational module to provide a translational driving force for translating the surgical wire; a rotational module for axially rotating the surgical wire, so that the translational module and the translational motor are rotated together when the surgical wire is axially rotated; a translational motor driver for providing a translational driving force to the translational motor; and a rotary connection module for providing a path with respect to an electrical line for electrically connecting the translational motor driver to the translational motor, wherein the rotary connection module is arranged in a longitudinal direction of the surgical wire and includes connection plates of a number corresponding to each of at least one electrical line, the at least one connection plate is formed with a slit opened toward a center to use the surgical wire in a direction of a rotational axis of the translational module by the rotational module, has one side connected to the electrical line, and is disposed with a connection ring having an annular strip-shaped with one side opened in a circumferential direction by the slit, and the rotary connection module includes the multi-contact plate having at least two contact points at different positions in the circumferential direction on a surface of the connection ring to electrically connect the connection ring to the translational motor driver.

According to one embodiment of the present invention, the rotational module may include: a rotational motor for providing a driving force for axially rotating the surgical wire; and a rotational gear for receiving the driving force from the rotational motor, wherein the rotational gear is formed therein with a slit, in which the slit is formed at a circumferential position a same as the slit of the at least one connection plate.

According to one embodiment of the present invention, the translational module may include: a plurality of transfer rollers arranged in one direction in which the surgical wire comes into rolling contact; and a guide roller disposed on the transfer roller to guide a translational motion of the surgical wire while being rotated relative to the transfer roller.

According to one embodiment of the present invention, the multi-contact plate may be provided with a plurality of multi-contact plates and the multi-contact plates may be offset at left and right sides of the surgical wire based on the loaded surgical wire.

According to one embodiment of the present invention, the multi-contact plate may include: a main body portion extending in one direction; and a branch portion branched in at least two branches from one end of the main body portion in a longitudinal direction so as to come into contact with the surface of the connection ring.

According to one embodiment of the present invention, the multi-contact plate may have two contact points with respect to the connection ring.

According to one embodiment of the present invention, the rotary connection module may further include: a base unit for supporting the multi-contact plate; and a power supply unit mounted to the base unit to supply power to the translational motor and the translational motor driver through the multi-contact plate.

According to one embodiment of the present invention, the at least one connection plate may be formed therein with electrical line connection portions corresponding to a number of the at least one electrical line, in which the electrical line connection portions are formed in a circumferential direction, and one electrical line connected to one electrical line connection portion is electrically connected to one connection ring.

According to one embodiment of the present invention, the surgical wire may be any one of a guide wire inserted into a conduit and a micro-guide wire inserted into a micro-conduit inserted into the conduit.

According to one embodiment of the present invention, the vascular intervention robot further includes: a conduit driving unit, wherein the conduit driving unit rotates and translates the conduit extending in the longitudinal direction around the longitudinal direction as an axis.

According to one embodiment of the present invention, the guide wire may be translated into the conduit by the translational module and coaxially rotated with the conduit by rotation of the translational module and the translational motor by the rotational module.

According to one embodiment of the present invention, the vascular intervention robot further includes: a micro-conduit driving unit, wherein the micro-conduit driving unit is provided at a rear of the conduit driving unit to translate the micro-conduit through a path, which is coaxial to the conduit and different from a path in and out which the guide wire is drawn, when the guide wire is drawn out from the inside of the conduit.

According to one embodiment of the present invention, the micro-guide wire may be translated into the micro-conduit by the translational module and coaxially rotated with the micro-conduit by rotation of the translational module and the translational motor by the rotational module.

Meanwhile, the present invention provides a vascular intervention system.

According to one embodiment of the present invention, the vascular intervention system includes: a vascular intervention robot; and a frame for fixing the vascular intervention robot to a surgical bed so that the vascular intervention robot is movable relative to a surgical bed.

Advantageous Effects

According to one embodiment of the present invention, the vascular intervention robot having a multi-contact plate includes: a translational module for translating a surgical wire; a translational motor disposed on one side of the translational module to provide a translational driving force for translating the surgical wire; a rotational module for axially rotating the surgical wire, so that the translational module and the translational motor are rotated together when the surgical wire is axially rotated; a translational motor driver for providing a translational driving force to the translational motor; and a rotary connection module for providing a path with respect to an electrical line for electrically connecting the translational motor driver to the translational motor, wherein the rotary connection module is arranged in a longitudinal direction of the surgical wire and includes connection plates of a number corresponding to each of at least one electrical line, the at least one connection plate is formed with a slit opened toward a center to use the surgical wire in a direction of a rotational axis of the translational module by the rotational module, has one side connected to the electrical line, and is disposed with a connection ring having an annular strip-shaped with one side opened in a circumferential direction by the slit, and the rotary connection module includes the multi-contact plate having at least two contact points at different positions in the circumferential direction on a surface of the connection ring to electrically connect the connection ring to the translational motor driver.

Therefore, the present invention provides the vascular intervention robot, so that a surgical wire can be easily loaded at an initial setting.

In addition, the embodiment of the present invention provides the vascular intervention robot capable of preventing electrical lines connected to a translational motor from being twisted and signals from being disconnected due to the twisting. Accordingly, the rotational and translational movements of the surgical wire can be stably achieved without discontinuation during vascular intervention.

In other words, the embodiment of the present invention provides the vascular intervention robot and the vascular intervention system including the same, so that convenience and stability of the vascular intervention procedure can be improved and the procedure time can be reduced.

DESCRIPTION OF DRAWINGS

FIG. 1 is a schematic diagram showing hepatic cancer and a nutrient-fed hepatic artery.

FIG. 2 is a photograph showing a conduit (left) and a micro-conduit-induced iron wire assembly (right) used in a TACE procedure.

FIG. 3 is a schematic view of a procedure showing an insertion conduit having a diameter of 6-7 F on the outside and a state in which a guide wire having a diameter of 3-4 F is rotatably inserted in the insertion conduit.

FIG. 4 is a photograph showing an example of hepatic artery chemoembolization.

FIG. 5 is a view for explaining a vascular intervention system using a vascular intervention robot according to one embodiment of the present invention.

FIG. 6 is a perspective view showing the vascular intervention robot according to the one embodiment of the present invention.

FIG. 7 is a view showing an arrangement state of a conduit, a guide wire, and a micro-conduit when a front end of the guide wire returns to an initial setting position in the vascular intervention robot according to the one embodiment of the present invention.

FIG. 8 is a perspective view showing a guide wire driving unit of the vascular intervention robot according to the one embodiment of the present invention.

FIG. 9 is a perspective view showing a translational module and a translational motor of the vascular intervention robot according to the one embodiment of the present invention.

FIGS. 10 and 11 are reference views for explaining the guide wire driving unit of the vascular intervention robot according to the one embodiment of the present invention.

FIGS. 12 and 13 are schematic diagrams for explaining a rotary connection module of the vascular intervention robot according to the one embodiment of the present invention.

FIG. 14 is a flowchart sequentially showing a method for driving the vascular intervention robot according to the one embodiment of the present invention.

FIGS. 15 to 21 are reference views for explaining each step of the method for driving the vascular intervention robot according to the one embodiment of the present invention.

BEST MODE

Mode for Invention

Hereinafter, preferred embodiments of the present invention will be described in detail with reference to the accompanying drawings. However, the technical idea of the present invention is not limited to the exemplary embodiments described herein and may be embodied in other forms. Further, the embodiments are provided to enable contents disclosed herein to be thorough and complete and provided to enable those skilled in the art to fully understand the idea of the present invention.

Herein, when one component is mentioned as being on other component, it signifies that the one component may be placed directly on the other component or a third component may be interposed therebetween. In addition, in the drawings, shapes and sizes may be exaggerated to effectively describe the technical content of the present invention.

In addition, although terms such as first, second and third are used to describe various components in various embodiments of the present specification, the components will not be limited by the terms. The above terms are used merely to distinguish one component from another. Accordingly, a first component referred to in one embodiment may be referred to as a second component in another embodiment. Each embodiment described and illustrated herein may also include a complementary embodiment. In addition, the term "and/or" is used herein to include at least one of the components listed before and after the term.

The singular expression herein includes a plural expression unless the context clearly specifies otherwise. In addition, it will be understood that the term such as "include" or "have" herein is intended to designate the presence of feature, number, step, component, or a combination thereof recited in the specification, and does not preclude the possibility of the presence or addition of one or more other features, numbers, steps, components, or combinations thereof. In addition, the term "connection" is used herein to include both indirectly connecting a plurality of components and directly connecting the components.

In addition, in the following description of the embodiments of the present invention, the detailed description of known functions and configurations incorporated herein will be omitted when it possibly makes the subject matter of the present invention unclear unnecessarily.

FIGS. 5 to 13 are views showing a vascular intervention robot according to one embodiment of the present invention.

As shown in FIG. 5, a vascular intervention robot 1000 according to one embodiment of the present invention may be applied to a vascular intervention system composed of a remote procedure system based on master-slave device. According to the vascular intervention system, an operator remotely controls the procedure on a master device side, and a slave device performs the procedure on the patient according to the remote control. Accordingly, the present invention may minimize an environment in which the operator is exposed to radiation.

First, the vascular intervention system will be briefly described. The vascular intervention system may further include a bed 1100, a frame 1200 and a master device 1300 in addition to the vascular intervention robot 1000 according to one embodiment of the present invention.

The bed 1100 provides a procedure surface on which a patient 1120 is allowed to lie, so that the patient may receive the procedure while lying down. The frame 1200 may be movably attached to the bed 1100. One side of the frame 1200 may accommodate and fix the vascular intervention robot 1000.

For example, the vascular intervention robot 1000 may be mounted on an upper side of the frame 1200. The vascular intervention robot 1000 may be mounted to be rotatable or translatable with respect to the frame 1200. The other side of the frame 1200 may be attached to the bed 1100 so as to be movable.

For example, the other side of the frame 1200 may be movably attached to a rail of the bed 1100. As described above, the vascular intervention robot 1000 is provided to be rotatable and translatable with respect to the frame 1200, so that convenience of the procedure may be improved.

Meanwhile, the master device 1300 may provide an interface for enabling an operator 1110 to remotely control the vascular intervention robot 1000. As described above, the operator 1110 may remotely control the vascular intervention robot 1000, so that radiation exposure on the operator may be minimized.

As shown in FIGS. 6 to 9, the vascular intervention robot 1000 according to one embodiment of the present invention applied to the vascular intervention system may include a translational module 220, a translational motor 223, a rotational module 240, a translational motor driver 224, and a rotary connection module 230.

In one embodiment of the present invention, the vascular intervention robot 1000 may include a conduit driving unit 100, a guide wire driving unit 200, a micro-conduit driving unit 300, and a micro-guide wire driving unit 400.

In addition, the vascular intervention robot 1000 may further include a transfer unit 500 and a conduit guide unit 600.

The translational module 220, the translational motor 223, the rotational module 240, the translational motor driver 224, and the rotary connection module 230 may be applied as a driving means of the guide wire driving unit 200.

In addition, the translational module 220, the translational motor 223, the rotational module 240, the translational motor driver 224, and the rotary connection module 230 may be applied as driving means of the micro-guide wire driving unit 400.

In other words, the translational module 220, the translational motor 223, the rotational module 240, the translational motor driver 224, and the rotary connection module 230 may be applied to at least one of the guide wire driving unit 200 and the micro-guide wire driving unit 400.

Thus, hereinafter, the case in which the translational module 220, the translational motor 223, the rotational module 240, the translational motor driver 224, and the rotary connection module 230 are commonly applied to the guide wire driving unit 200 and the micro-guide wire driving unit 400 will be described.

The conduit driving unit 100 may rotate and translate a conduit 20 extending in the longitudinal direction around a longitudinal axis. Accordingly, the conduit driving unit 100 may insert the conduit 20 into a target blood vessel. The conduit driving unit 100 may rotate the conduit while gripping the conduit 20.

For example, when the conduit 20 encounters a curved portion of a blood vessel, the conduit driving unit 100 may rotate the conduit 20 about the longitudinal axis of the conduit 20 in order to change the direction of a front end thereof. To this end, the conduit driving unit 100 may include a conduit rotation driving body 110 and a gear 115.

The conduit rotation driving body 110 refers to a device for providing a rotational driving force for rotating the conduit 20, and may be provided as, for example, a motor.

The gear 115 may receive a rotational driving force from the conduit rotation driving body 110 to provide the rotational force for rotating the conduit 20. The gear 115 may be provided with a slit through which the conduit 20 may be loaded in the axial direction of the gear 115.

Referring to FIG. 7, the conduit driving unit 100 may further include a first Y-shaped connector 120. The first Y-shaped connector 120 provides a connection path between the conduit 20 and the guide wire 10 and between the conduit 20 and the micro-conduit 40.

To this end, the first Y-shaped connector 120 may include a main body 123 and a branch portion 125.

The main body 123 may have a tubular shape in which the inside thereof has a hollow. The main body 123 may have an opened longitudinal one end so that the conduit 20 may be inserted thereto and gripped.

In addition, the main body 123 may have a longitudinal other end connected to the micro-conduit driving unit 300. Accordingly, a longitudinal front end of the micro-conduit 40 may be positioned at the longitudinal other end of the main body 123.

However, in an initial setting for inserting the conduit 20 and the guide wire 10 into the target blood vessel, the micro-conduit 40 is not mounted in the micro-conduit driving unit 300. Accordingly, in the initial setting, the longitudinal front end of the micro-conduit 40 is not positioned at the longitudinal other end of the main body 123.

Like the main body 123, the branch portion 125 may have a tubular shape in which the inside has a hollow. The branch portion 125 may be formed to branch from one side of the main body 123 in the longitudinal direction. The hollow of the branch portion 125 may communicate with the hollow of the main body 123.

In an exemplary embodiment of the present invention, the guide wire driving unit 200 configured to rotate and translate the guide wire 10 may be connected to a longitudinal end of the branch portion 125.

In the initial setting for inserting the conduit 20 and the guide wire 10 into the target blood vessel, a rear end of the conduit 20 in the longitudinal direction may be inserted and gripped into one end of the main body 123 in the longitudinal direction, and the front end of the guide wire 10 may be disposed at a branch point side of the branch portion 125.

Thereafter, when the vascular intervention robot 1000 is operated and the guide wire 10 and the conduit 20 are inserted into the target blood vessel, the guide wire 10 is moved rearward and the front end thereof is returned to the initial setting position. As described above, when the front end of the guide wire 10 returns to the initial setting position, the micro-conduit 40 may be mounted in the micro-conduit driving unit 300. Accordingly, the front end of the micro-conduit 40 is positioned at the other end of the main body 123 in the longitudinal direction.

Accordingly, when the micro-conduit 40 is drawn into the conduit 20, the micro-conduit 40 may be drawn in and out through a path different from the draw-in-and-out path of the guide wire 10 with respect to the conduit 20.

According to one embodiment of the present invention, the micro-conduit 40 may be drawn in and out coaxially with respect to the conduit 20. Accordingly, when the micro-conduit 40 is inserted into the conduit 20, the guide wire 10 is prevented from being interfered with the draw-in-and-out, and as a result, the convenience of the vascular intervention procedure may be improved and the procedure time may be shortened.

The first Y-shaped connector 120 may be seated in the case 133. A cover 135 may be coupled to an upper side of the case 133.

The cover 135 may be coupled to the case 133 while covering the first Y-shaped connector 120. The case 133 and the cover 135 serve to protect the first Y-shaped connector 120 from an external environment.

Meanwhile, the conduit driving unit 100 may translate the conduit 20 such that the conduit 20 is inserted to the target blood vessel. To this end, the conduit driving unit 100 may further include a conduit translational driving body 150.

The conduit translational driving body 150 provides a driving force to a rack 550 and a pinion 560 provided in the transfer unit 50, and moves the conduit driving unit 100 mounted in the assembly of the rack 550 and the pinion 560. The conduit 20 is translated through the movement of the conduit driving unit 100.

According to one embodiment of the present invention, the guide wire driving unit 200 is provided at a lateral side of the conduit driving unit 100. The guide wire driving unit 200 translates the guide wire 10 to draw the guide wire 10 into the conduit 20 and insert the guide wire 10 up to the vicinity of the target vessel, and rotates the guide wire 10 coaxially with the conduit 20.

The guide wire driving unit 200 is connected to the branch portion 125 of the first Y-shaped connector 120. To this end, the guide wire driving unit 200 may include a second Y-shaped connector 210 serving as a connection means and coupled to the branches 125 of the first Y-shaped connector 120.

The second Y-shaped connector 210 may have the same structure as the first Y-shaped connector 120.

Accordingly, the guide wire driving unit 200 may provide the guide wire 10 into the conduit 20 drawn in and grasped at the longitudinal one end of the main body 123 through the second Y-shaped connector 210 and the branch portion 125 of the first Y-shaped connector 120.

The guide wire driving unit 200 may have, as driving means, the above-described translational module 220, translational motor 223, rotational module 240, translational motor driver 224, and rotary connection module 230.

The translational module 220 may translate a surgical wire. The wire translated by the translational module 220 may be the guide wire 10.

The translational module 220 may include a transfer roller 221 and a guide roller 222. A plurality of transfer rollers 221 may be provided. The transfer rollers 221 may be arranged in one direction, for example, a transferring direction of the guide wire 10. Accordingly, the guide wire 10 may be moved while coming into rolling contact with the transfer rollers 221 arranged in the one direction, and may be drawn toward the second Y-shaped connector 210.

A plurality of guide rollers 223 may be provided. The guide rollers 223 may be disposed on the transfer rollers 221. The guide rollers 223 may be disposed to correspond to the transfer rollers 221, respectively, to guide the translation motion of the guide wire 10 while rotating relative to the transfer roller 221.

In other words, the guide wire 10 passes between the transfer roller 221 and the guide roller 223, which are vertically disposed, while coming into rolling contact.

The translational motor 223 may be disposed at one side of the translational module 220. The translational motor 223 may provide a translational driving force for translating the guide wire 10 to the translational module 220, more specifically, to the transfer roller 221 of the translational module 220.

A kind of gear may be disposed between the translational motor 223 and the transfer roller 221 to transfer the translational driving force generated from the translational motor 223 to the at least one transfer roller 221.

The rotational module 240 axially rotates the guide wire 10. When the guide wire 10 is axially rotated by the rotational module 240, the translational module 220 is rotated together with the translational motor 223.

The rotational module 240 may include a rotational motor 237 and a rotational gear 236. The rotational motor 237 may provide a driving force for axially rotating the guide wire 10. The rotational gear 236 receives the driving force from the rotational motor 237.

To this end, the rotational gear 236 may be axially coupled to the rotary shaft of the rotational motor 237. The rotational gear 236 may be coaxially connected to the translational module 220, and accordingly, the driving force provided from the rotational motor 237 may be transferred to the translational module 220 through the rotational gear 236.

A slit may be formed in the rotational gear 236. The slit may be formed at the same position in a circumferential direction as a slit 230a of at least one connection plate 231 described later.

Accordingly, the slit of the rotational gear 236 and the slits 230a of the at least one connection plate 231 form a trench communicating in one direction, and the guide wire 10 may be loaded in the trench in the longitudinal direction.

Referring to FIGS. 10 and 11, the translational motor driver 224 may provide a translational driving force to the translational motor 223. To this end, the translational motor driver 224 may be electrically connected to the translational motor 223 through a plurality of electrical lines 225.

When the translational module 220 and the translational motor 223 are rotated together by the rotational module 240, the electrical lines 225 electrically connected between the translational motor 223 and the translational motor driver 224 may be twisted.

When the twisting continues, some or all of the electrical lines 225 may be separated from the translational motor 223 or the translational motor driver 224, thereby causing an emergency in which the operation of the vascular intervention robot 1000 in required to stop during the procedure.

In order to solve the above problem, the vascular intervention robot 1000 according to one embodiment of the present invention may include the rotary connection module 230.

The rotary connection module 230 may provide paths for the electrical lines 225 electrically connected between the translational motor driver 224 and the translational motor 223.

Referring to FIGS. 12 and 13, the rotary connection module 230 according to one embodiment of the present invention may include a connection plate 231.

The connection plate 231 may be disposed behind the rotational gear 236. The connection plate 231 may be directly connected to the rotational gear 236. Accordingly, the connection plate 231 may be interlocked with the rotation of the rotational gear 236.

The number of the connection plate 231 may correspond to the electrical lines 225 electrically connected between the translational motor 223 and the translational motor driver 224. In other words, each of the connection plates 231 may correspond to any one of the electrical lines 225.

The connection plates 231 may be arranged, behind the rotational gear 236, in one direction, for example, in the longitudinal direction of the guide wire 10.

Each of the connection plates 231 may be formed with a slit 230a opened in a central direction so as to use the guide wire 10 in the axial direction of the rotation of the translational module 220 by the rotational module 240. As described above, the slits 230a are connected to the slits of the rotational gear 236 to form a single trench structure.

A connection ring 232 may be disposed on the connection plate 231. The connection ring 232 may be provided in a shape of an annular strip having one side opened in the circumferential direction by the slit 230a.

The connection plate 231 may be provided with a plurality of electrical line connection parts 232a corresponding to the number of the electrical lines 225. The electrical line connection part 232a may be formed in the circumferential direction of the connection plate 231.

Based on one connection plate 231, one specific electrical line 225 may be connected to any one of the electrical line connection parts 232a and connected to the connection ring 232 provided in the corresponding connection plate 231.

Accordingly, when the connection plates 231 arranged in one direction are viewed from the front, the electrical lines 225 may be connected to the corresponding connection rings 232, respectively, while being spaced apart from each other in the circumferential direction without overlapping with each other.

Meanwhile, the rotary connection module 230 according to one embodiment of the present invention may further include a multi-contact plate 233.

The multi-contact plate 233 may have at least two contact points at different positions in the circumferential direction on a surface of the connection ring 232 to electrically connect the connection ring 232 and the translational motor driver 224.

Accordingly, even though any one contact point is disconnected by the slit 230a when the connection plate 231 is rotated, the other contact point is continuously maintained, and thus the electrical connection state between the connection ring 232 and the translational motor driver 224 may be continuously maintained.

According to one embodiment of the present invention, a plurality of multi-contact plates 233 may be provided. The multi-contact plates 233 may be connected to the connection rings 232, respectively. Accordingly, the multi-contact plates 233 may also be arranged in the same direction as the arrangement direction of the connection rings 232.

In this case, according to one embodiment of the present invention, the multi-contact plates 233 may be offset to each other in one direction to prevent interference between the multi-contact plates 233 arranged in the one direction.

For example, based on the rotational gears 236, the multi-contact plates 233 disposed in an odd-numbered order may be disposed at a lower left end of the connection ring 232 (see FIG. 12), and the multi-contact plates 233 disposed in an even-numbered order may be disposed at a lower right end (see FIG. 12).

The multi-contact plate 233 according to one embodiment of the disclosure may have two contact points with respect to the connection ring 232.

The multi-contact plate 233 may be formed of a metal material having conductivity and include a main body portion 233a and branch portion 233b.

The main body portion 233a may be provided as a plate shape extending in one direction. The branch portion 233b may be branched into two branches from one end of the main body portion 233a in the longitudinal direction.

As described above, one ends of the branch portion 233b extending in the longitudinal direction and branched into the two branches may come into contact with the surface of the connection ring 232. In other words, the two branches of the branch portion 233b may come into contact with the surface of the connection ring 232 at different positions in the circumferential direction.

The branch portion 233b is branched into the two branches merely as one example, and the branch portion may be branch into more branches to come into contact with several positions on the surface of the connection ring 232.

Meanwhile, the rotary connection module 230 according to one embodiment of the present invention may further include a base unit 234 and a power supply unit 235.

The base unit 234 supports the multi-contact plate 233. Specifically, the main body portion 233a of the multi-contact plate 233 may be coupled and fixed to the base unit 234. Accordingly, the branch portion 233b of the multi-contact plate 233 may maintain a stable contact with the connection ring 232.

The power supply 235 may be mounted on the base unit 234. The power supply unit 235 may be electrically connected to the multi-contact plate 233. Accordingly, the power supply unit 235 may supply power to the translational motor 223 and the translational motor driver 224 through the multi-contact plate 233, the connection ring 232, and the electrical line 225.

In the initial setting for inserting the conduit 20 and the guide wire 10 into the target blood vessel, the front end of the guide wire 10 may be disposed at a branch point side of the branch portion 125 forming the first Y-shaped connector 120, by the translational module 220.

In addition, the guide wire 10 may be drawn into the conduit 20 by the translational module 220 and may be inserted near the target vessel through subsequent translational motions. The guide wire 10 may be rotated by the rotational module 240 when encountering a curved site of the blood vessel during the translational motion, and thus the direction of the front end thereof is switched, thereby allowing the translational motion to be smoothly performed again.

In addition, when the insertion of the conduit 20 into the target blood vessel is completed, the guide wire 10 is moved rearward by the translational module 220, so that the front end thereof returns to the initial setting position.

Referring back to FIGS. 6 and 7, the micro-conduit driving unit 300 may be provided at rear of the conduit driving unit 100.

When the guide wire 10 is drawn out from the inside of the conduit 20 and returned to the initial setting position, the micro-conduit driving unit 300 draws the micro-conduit 40 into a path different from the path for drawing in and out the guide wire 10, that is, into a path coaxial to the conduit 20, thereby translating the micro-conduit 40.

The micro-conduit driving unit 300 according to one embodiment of the present invention may include a front end mounting portion 300A and a rear end mounting portion 300B.

The front end mounting portion 300A may be directly connected to the conduit driving unit 100. The front end mounting portion 300A may be mounted therein with the longitudinal front end part of the micro-conduit 40. The front end mounting portion 300A may have a driving means for rotating and translating the micro-conduit 40.

Since detailed configurations and operations of the driving means are the same as or similar to the detailed configurations and operations of the translational module 220 and the rotational module 240 applied to the guide wire driving unit 200, a detailed description thereof will be omitted.

In the initial setting for inserting the conduit 20 and the guide wire 10 into the target vessel, since the front end mounting portion 300A is directly connected to the conduit driving unit 100, the front end mounting portion 300A is moved together when the conduit driving unit 100 is moved.

In the initial setting for inserting the conduit 20 and the guide wire 10 into the target blood vessel, the longitudinal front end of the micro-conduit 40 is not mounted on the front end mounting portion 300A.

When the insertion of the conduit 20 into the target blood vessel is completed and the front end of the guide wire 10 is returned to the initial setting position, the longitudinal front end of the micro-conduit 40 may be mounted on the front end mounting portion 300A.

The rear end mounting portion 300B is spaced apart rearward from the front end mounting portion 300A. When the front end mounting portion 300A is moved by the movement of the conduit driving unit 100 during the initial setting for inserting the conduit 20 and the guide wire 10 into the target blood vessel, the rear end mounting portion 300B may maintain a home position state without being interlocked with the above movement. The rear end mounting portion 300B may be connected to the micro-guide wire driving unit 400.

The rear end of the micro-conduit 40 is mounted to the rear end mounting portion 300B. The rear end mounting portion 300B may include a third Y-shaped connector 330

(in FIG. 15) for rear end mounting of the micro-conduit 40. The third Y-shaped connector 330 (FIG. 15) may have the same structure as the first and second Y-shaped connectors 120 and 210.

The third Y-shaped connector 330 serves to provide a connection path through which the micro-guide wire 30 positioned at the other end in the longitudinal direction may be inserted into the micro-conduit 40 mounted at one end in the longitudinal direction.

After the insertion of the micro-conduit 40 into the target blood vessel is completed and the front end of the guide wire 10 is returned to the initial setting position, the micro-conduit 40 may be first set to have a first tension when the micro-conduit 40 is set to be mounted to the micro-conduit driving unit 300 in order to insert the micro-conduit 40 and the micro-guide wire 30 into the target micro-vessel.

In other words, as shown in drawings, the micro-conduit 40 may be loosely connected between the front end mounting portion 300A and the rear end mounting portion 300B (see FIG. 18).

In this state, in order to perform the vascular intervention procedure, the translational module 220 provided at the front end mounting portion 300A forwardly translates the front end of the micro-conduit 40 having the longitudinal rear end fixed to the rear end mounting portion 300B and accordingly, inserts the micro-conduit 40 into the conduit 20.

Accordingly, during the vascular intervention, the micro-channel 40 has a second tension increased in intensity compared with having the first tension (see FIG. 19). In other words, the micro-conduit 40 may be changed from the loose state to a taut state as shown in the drawing.

The rear end mounting portion 300B may include a micro-conduit translational driving body 340 (see FIG. 15). The micro-conduit translational driving body 340 provides power for moving the rear end mounting portion 300B, and accordingly, the micro-conduit 40 is translated. The micro-conduit translational driving body 340 may be synchronized with the conduit translational driving body 150 that provides power for moving the conduit driving unit 100.

Accordingly, when the rear end mounting portion 300B is moved by the micro-conduit translational driving body 340 to translate the micro-conduit 40 during the vascular intervention procedure, the conduit driving unit 100 and the front end mounting portion 300A connected thereto are moved at the same speed and distance as those of the rear end mounting portion 300B by the conduit translational driving body 150 synchronized therewith, so that the second tension of the micro-conduit 40 may be continuously maintained during the vascular intervention procedure.

When the conduit 20 and the micro-conduit 40 reach an end of the blood vessel that meets the micro-blood vessel through the synchronization of the micro-conduit translational driving body 340 and the conduit translational driving body 150, the synchronization between the micro-conduit translational driving body 340 and the conduit translational driving body 150 may be released and only the micro-conduit translational driving body 340 may be driven. Accordingly, only the micro-conduit 40 continues to perform translational motion inside the micro-blood vessel.

The micro-guide wire driving unit 400 may be provided at rear of the micro-conduit driving unit 300, more specifically, the rear end mounting portion 300B. The micro-guide wire driving unit 400 may translate the micro-guide wire 30 to draw the micro-guide wire 30 into the micro-conduit 40 and insert the micro-guide wire 30 to the vicinity of the target micro-vessel, and may rotate the micro-guide wire 30 coaxially with the micro-conduit 40.

The front end of the micro-guide wire 30 mounted on the micro-guide wire driving unit 400 may be disposed at the other end in the longitudinal direction of the third Y-shaped connector 330 provided in the rear end mounting unit 300B.

Since the micro-guide wire driving unit 400 may have the same driving means 420 and 430 as the translational module 220, the translational motor 223, the rotational module 240, the translational motor driver 224, and the rotary connection module 230, which are provided as driving means in the guide wire driving unit 200, to rotate and translate the micro-guide wire 30, a detailed description thereof will be omitted.

Upon the setting to insert the micro-conduit 40 and the micro-guide wire 30 into the target micro-vessel, the micro-guide wire 30 is mounted to the micro-guide wire driving unit 400. The micro-guide wire 30 may be translated by the driving means, drawn into the micro-conduit 40, and inserted near the target micro-vessel.

In addition, when the translating micro-guide wire 30 encounters a curved site of the micro-vessel, the micro-guide wire 30 may be rotated by the driving means, and accordingly, a direction of the front end of the micro-guide wire 30 may be adjusted. As a result, the micro-guide wire 30 may be continuously translated toward the target micro-blood vessel.

Meanwhile, the transfer unit 500 may receive driving force from the conduit translational driving body 150 and the micro-conduit translational driving body 340 to transfer the conduit driving unit 100 and the micro-conduit driving unit 300 in the longitudinal direction of the conduit 20.

The transfer unit 500 may include a base portion 510, a first partition wall 520, a second partition wall 530, a support rod 540, a rack 550, and a pinion 560.

The base portion 510 may be a frame that provides a base surface of the vascular intervention robot 1000. The first partition wall 520 and the second partition wall 530 may be provided at both ends of the base portion 510 in the longitudinal direction. The support rod 540 may be provided between the first partition 520 and the second partition 530. The rack 550 may be provided on an upper surface of the base portion 510 in the longitudinal direction of the vascular intervention robot 1000. The pinion 560 may be gear-coupled to the rack 550 and operated by receiving the driving force from the conduit translational driving body 150 or the micro-conduit translational driving body 340. Accordingly, the conduit driving unit 100 and the micro-conduit driving unit 300 mounted in the assembly of the rack 550 and the pinion 560 may be moved in the longitudinal direction of the vascular intervention robot 1000.

The pinion 560 may be connected to each of the conduit driving unit 100 and the micro-conduit driving unit 300 so as to allow the conduit driving unit 100 and the micro-conduit driving unit 300 to be individually moved, and the conduit translational driving body 150 and the micro-conduit translational driving body 340 may provide a driving force to the pinion 560 connected to the conduit driving unit 100 and the micro-conduit driving unit 300, respectively.

Meanwhile, the support rod 540 may provide a guide path for moving the conduit driving unit 100 and the micro-conduit driving unit 300.

The conduit guide unit 600 may perform a function of supporting the conduit 20 while being folded in the longitudinal direction of the conduit 20. The conduit guide unit 600 may be provided in the form of a tube extending in one direction. The conduit guide unit 600 may have a hollow formed therein in the longitudinal direction to allow the conduit 20 to be inserted and moved, and longitudinal both ends thereof may be opened.

In one embodiment of the present invention, the conduit guide unit 600 may have a telescope structure so as to be folded.

Hereinafter, a method of driving the vascular intervention robot according to one embodiment of the present invention will be described with reference to FIGS. 14 to 21.

FIG. 14 is a flowchart sequentially showing a method of driving the vascular intervention robot according to one embodiment of the present invention, and FIGS. 15 to 21 are reference views for describing each step of the method of driving the vascular intervention robot according to one embodiment of the present invention.

Referring to FIG. 14, the method of driving the vascular intervention robot according to one embodiment of the present invention may include steps S110 to S160.

Step S110

Referring to FIG. 15, step S110 is an initial setting step in which the conduit 20 is mounted in the conduit guide unit 600. In this step, the rear end of the conduit 20 in the longitudinal direction is drawn in and gripped by the longitudinal one end of the main body 123 forming the first Y-shaped connector 120.

In step S110, the guide wire 10 is longitudinally loaded into the slits 230*a* of the connection plates 231 and the slits of the rotational gears 236 forming the single trench structure.

Next, in step S110, the translational module 220 is driven to dispose the front end of the guide wire 10 to reach the branch point of the branch portion 125 forming the first Y-shaped connector 120. In the initial setting step, the micro-conduit 40 and the micro-guide wire 30 are not mounted in the micro-conduit driving unit 300 and the micro-guide wire driving unit 400.

Step S120

Referring to FIG. 16, in step S120, the translational module 220 is driven so that the guide wire 10 disposed at the branch portion 125 side is translated, thereby drawing the guide wire 10 into the conduit 20.

Next, in step S120, the translational module 220 is driven to continuously translate the guide wire 10, thereby inserting the guide wire 10 into the vicinity of the target blood vessel.

At this time, in step S120, the rotational module 230 may be driven to rotate the translating guide wire 10 when the translating guide wire 10 encounters a bent site of the blood vessel, thereby adjusting the front end direction of the guide wire 10. Accordingly, the guide wire 10 may be smoothly inserted to the vicinity of the target blood vessel.

The guide wire 10 may be rotated by the rotation of the translational module 220 rotated by the rotational module 230. The translational motor 223 is also rotated together when the translational module 220 is rotated.

The electrical line 225 electrically connected between the translational motor driver 224 and the translational motor 223 may be maintained in a stable connection state by the connection ring 232 of the rotary connection module 230.

In addition, even when the connection ring 232 having one side opened in the circumferential direction is rotated, the electrical connection state may be maintained constantly by the multi-contact plate 233 of the rotary connection module 230.

Meanwhile, in step S120, the guide wire 10 is inserted into the vicinity of the target blood vessel, and then the conduit translational driving body 150 is driven to translate the conduit 20, thereby inserting the conduit 20 up to the target blood vessel.

The translational motion of the conduit 20 may be performed by the movement of the conduit driving unit 100. In addition, when the conduit driving unit 100 is moved, the front end mounting unit 300A of the micro-conduit driving unit 300 directly connected to the rear of the conduit driving unit is also moved together.

In step S120, like the guide wire 10, when the moving vessel 20 encounters the curved site of the blood vessel, the conduit rotation driving body 110 may be driven to rotate the translating conduit 20, thereby adjusting the front end direction of the conduit 20. Accordingly, the conduit 20 may be smoothly inserted up to the target blood vessel.

Step S130

Referring to FIG. 17, in step S130, while the conduit 20 is inserted to the target blood vessel, the translational module 220 of the guide wire driving unit 200 is driven to move the guide wire 10 rearward, thereby returning the guide wire 10 to the initial setting position. Accordingly, the front end of the guide wire 10 in the longitudinal direction is positioned at a branch point side of the branch portion 125.

Step S140

Referring to FIG. 18, in step S140, the micro-conduit 40 is mounted in the micro-conduit driving unit 300. Specifically, in step S140, the longitudinal front end of the micro-conduit 40 is mounted to the front end mounting portion 300A, and the longitudinal rear end thereof is mounted to the rear end mounting portion 300B spaced apart rearward from the front end mounting portion 300A.

In the step S140, the micro-conduit 40 may be mounted such that the longitudinal front end of the micro-conduit 40 is positioned at the longitudinal other end of the main body 123 forming the first Y-shaped connector 120.

In step S140, the micro-conduit 40 may be mounted such that the micro-conduit 40 has the first tension. In other words, in step S140, the micro-conduit 40 may be loosely mounted as shown in the drawing.

Meanwhile, in step S140, after the micro-conduit 40 is mounted, the micro-guide wire 30 may be mounted to the micro-guide wire driving unit 400.

In step S140, the micro-guide wires 30 may be longitudinally loaded in the slits of the connection plates and the slits of the rotational gears forming the single trench structure.

Step S150

Referring to FIG. 19, in step S150, the translational module 310 provided in the front end mounting portion 300A is driven to forwardly translate the front end of the micro-conduit 40 having the longitudinal rear end fixed to the rear end mounting portion 300B, thereby drawing the micro-conduit 40 into the conduit 20.

Accordingly, the micro-conduit 40 has the second tension increased in intensity compared with having the first tension set during setting. In other words, the micro-conduit 40 may be changed from a loose state upon setting to a taut state as shown in the drawing.

Step S160

Referring to FIGS. 20 and 21, in step S160, the translational module 420 provided in the micro-guide wire driving unit 400 is driven to translate the micro-guide wire 30, thereby drawing the micro-guide wire 30 into the micro-conduit 40.

Next, in step S160, the translational module 420 is driven to translate the micro-guide wire 30, thereby inserting the micro-guide wire 30 into the vicinity of the target micro-vessel.

In S160, when the translatable micro-guide wire 30 encounters a curved site of the micro-vessel, the rotational module provided in the micro-guide wire driving unit 400 may be driven to rotate the translatable micro-guide wire 30, thereby adjusting the front end direction of the micro-guide wire 30.

Accordingly, the micro-guide wire 30 may be smoothly inserted to the vicinity of the target micro-vessel.

The micro-guide wire 30 may be rotated by the rotation of the translational module 420 rotated by the rotational module, and the translational motor is also rotated together when the translational module 420 is rotated. The electrical line electrically connected between the translational motor driver and the translational motor may be maintained in a stable connection state by the connection ring of the rotary connection module.

In addition, even when the connection ring having one side opened in the circumferential direction is rotated, the electrical connection state may be constantly maintained by the multi-contact plate of the rotary connection module.

Next, in step S160, the micro-guide wire 30 is inserted into the vicinity of the target micro-vessel, and then the micro-conduit translational driving body 340 is driven to translate the micro-conduit 40, thereby inserting the micro-conduit 40 up to the target micro-vessel. The translational motion of the micro-conduit 40 may be performed by the movement of the micro-conduit driving unit 300.

Since the micro-conduit translational driving body 340 may be synchronized with the conduit translational driving body 150 provided in the conduit driving unit 100, the conduit driving unit 100 and the front end mounting portion 300A connected thereto are also moved together when the micro-conduit driving unit 300 is moved by the micro-conduit translational driving body 340. Accordingly, the micro-conduit 40 may be maintained in the second tension, that is, in the taut state.

In step S160, the micro-conduit translational driving body 340 and the conduit translational driving body 150 are synchronized to each other up to the end part of the blood vessel meeting the micro-blood vessel, so that the conduit 20 and the micro-conduit 40 may be translated together.

However, the conduit 20 having a relatively large diameter cannot be inserted into the micro-blood vessel any more. Thus, in step S160, when the micro-conduit 20 and the micro-conduit 40 reach the end of the blood vessel to meet the micro-blood vessel, the synchronization between the micro-conduit translational driving body 340 and the conduit translational driving body 150 may be released, and then only the micro-conduit translational driving body 340 may be driven.

Accordingly, the micro-conduit 20 may stop the translational motion at the end of the blood vessel that meets the micro-blood vessel, and the micro-conduit 40 may be continuously translated into the micro-blood vessel, so as to be inserted until the target micro-blood vessel.

Although not shown, the driving and releasing the synchronization between the micro-conduit translational driving body 340 and the conduit translational driving body 150 may be controlled by a control unit. The control unit may be provided on a master device side of the vascular intervention system.

Although the present invention has been described in detail using preferred embodiments, the scope of the present invention is not limited to a specific embodiment and will be interpreted by the appended claims. In addition, it will be understood by those skilled in the art that various modifications and deformations are possible without departing from the scope of the present invention.

The invention claimed is:

1. A vascular intervention robot having a multi-contact plate, the vascular intervention robot comprising:
   a translational module for translating a surgical wire;
   a translational motor disposed on one side of the translational module to provide a translational driving force for translating the surgical wire;
   a rotational module for axially rotating the surgical wire, so that the translational module and the translational motor are rotated together when the surgical wire is axially rotated;
   a translational motor driver for providing a translational driving force to the translational motor; and
   a rotary connection module for providing a path with respect to an electrical line for electrically connecting the translational motor driver to the translational motor, wherein
   the rotary connection module is arranged in a longitudinal direction of the surgical wire and includes connection plates of a number corresponding to each of at least one electrical line,
   the at least one connection plate is formed with a slit opened toward a center to use the surgical wire in a direction of a rotational axis of the translational module by the rotational module, has one side connected to the electrical line, and is disposed with a connection ring having an annular strip-shaped with one side opened in a circumferential direction by the slit, and
   the rotary connection module includes the multi-contact plate having at least two contact points at different positions in the circumferential direction on a surface of the connection ring to electrically connect the connection ring to the translational motor driver.

2. The vascular intervention robot of claim 1, wherein the rotational module includes:
   a rotational motor for providing a driving force for axially rotating the surgical wire; and
   a rotational gear for receiving the driving force from the rotational motor, wherein
   the rotational gear is formed therein with a slit, in which the slit is formed at a circumferential position a same as the slit of the at least one connection plate.

3. The vascular intervention robot of claim 1, wherein the translational module includes:
   a plurality of transfer rollers arranged in one direction in which the surgical wire comes into rolling contact; and
   a guide roller disposed on the transfer roller to guide a translational motion of the surgical wire while being rotated relative to the transfer roller.

4. The vascular intervention robot of claim 1, wherein the multi-contact plate is provided with a plurality of multi-contact plates and the multi-contact plates are offset at left and right sides of the surgical wire based on the loaded surgical wire.

5. The vascular intervention robot of claim 1, wherein the multi-contact plate includes:
   a main body portion extending in one direction; and
   a branch portion branched in at least two branches from one end of the main body portion in a longitudinal direction so as to come into contact with the surface of the connection ring.

6. The vascular intervention robot of claim 5, wherein the multi-contact plate has two contact points with respect to the connection ring.

7. The vascular intervention robot of claim 1, wherein the rotary connection module further includes:
   a base unit for supporting the multi-contact plate; and
   a power supply unit mounted to the base unit to supply power to the translational motor and the translational motor driver through the multi-contact plate.

8. The vascular intervention robot of claim 1, wherein the at least one connection plate is formed therein with electrical line connection portions corresponding to a number of the at least one electrical line, in which
   the electrical line connection portions are formed in a circumferential direction, and one electrical line connected to one electrical line connection portion is electrically connected to one connection ring.

9. The vascular intervention robot of claim 1, wherein the surgical wire includes any one of a guide wire inserted into a conduit and a micro-guide wire inserted into a micro-conduit inserted into the conduit.

10. The vascular intervention robot of claim 9, further comprising:
    a conduit driving unit, wherein
    the conduit driving unit rotates and translates the conduit extending in the longitudinal direction around the longitudinal direction as an axis.

11. The vascular intervention robot of claim 10, wherein the guide wire is translated into the conduit by the translational module and coaxially rotated with the conduit by rotation of the translational module and the translational motor by the rotational module.

12. The vascular intervention robot of claim 10, further comprising:
    a micro-conduit driving unit, wherein
    the micro-conduit driving unit is provided at a rear of the conduit driving unit to translate the micro-conduit through a path, which is coaxial to the conduit and different from a path in and out which the guide wire is drawn, when the guide wire is drawn out from the inside of the conduit.

13. The vascular intervention robot of claim 12, wherein the micro-guide wire is translated into the micro-conduit by the translational module and coaxially rotated with the micro-conduit by rotation of the translational module and the translational motor by the rotational module.

14. A vascular intervention system having a multi-contact plate, the vascular intervention system comprising:
    a vascular intervention robot of claim 1; and
    a frame for fixing the vascular intervention robot to a surgical bed so that the vascular intervention robot is movable relative to a surgical bed.

* * * * *